United States Patent Office 3,140,251
Patented July 7, 1964

3,140,251
PROCESS FOR CRACKING HYDROCARBONS WITH A CRYSTALLINE ZEOLITE
Charles J. Plank, Woodbury, and Edward J. Rosinski, Almonesson, N.J., assignors to Socony Mobil Oil Company, Inc., a corporation of New York
No Drawing. Filed Dec. 21, 1961, Ser. No. 161,241
19 Claims. (Cl. 208—120)

This invention relates to the catalytic conversion of hydrocarbons and more particularly to the catalytic cracking of high boiling hydrocarbon oils into hydrocarbons of lower boiling range in the presence of a new and improved catalyst.

A wide variety of materials have heretofore been proposed as catalysts for the cracking of high boiling hydrocarbons, such as gas oils, topped crudes, reduced crudes or similar materials, into lower boiling hydrocarbons boiling in the motor fuel range. The cracking catalysts most widely used are solid materials which behave in an acidic manner. Although catalysts of this type possess one or more desired characteristics, a great many of the acidic catalysts have undesirable characteristics, such as lack of thermal stability, availability, or mechanical strength, etc., whereby a wide range of suitable properties cannot be maintained. Synthetic silica-alumina composites, the most popular catalysts known to have been proposed heretofore, provide limited yields of gasoline for a given yield of coke and further suffer the disadvantage of rapidly deteriorating and becoming inactive in the presence of steam, particularly at temperatures above 1000° F. Other catalysts less widely used are materials of an argillaceous nature, e.g., bentonite and montmorillonite, which have been treated with acid to bring out their latent cracking characteristics. Catalysts of this general type are relatively inexpensive, but are only moderately active and exhibit a decline in activity over periods of many conversion and regeneration cycles. Some synthetic materials, such as silica-magnesia complexes, are more active than conventional silica-alumina catalysts and undergo normal aging, but have limited utility because of their poor product distribution as evidenced, for example, by low octane number of the gasoline.

Other disadvantages of heretofore proposed cracking catalysts include poor activity, chemical stability and product distribution in obtaining desired yields of useful products.

The present invention is based on the discovery that highly active hydrocarbon cracking catalysts can be obtained by admixing an inorganic oxide gel with an aluminosilicate containing a total of 0.5 to 1.0 equivalent of ion of positive valence per gram atom of aluminum wherein from 0.01 to 0.99 equivalent of said ions are hydrogen ions and from 0.99 to 0.01 equivalent of said ions are cations of metals selected from Group IB through Group VIII of the Periodic Table. The catalyst of this invention possesses a wide spectrum in magnitude of catalytic activity; can be used in relatively small concentrations; and permit certain hydrocarbon conversion processes to be carried out under practicable and controllable rates at lower temperatures than those previously employed. In the catalytic cracking of hydrocarbon oils into hydrocarbon products of lower molecular weight, the reaction rates per unit volume of catalyst that are obtainable by the catalyst of the invention vary up to many thousand times the rates achieved with the best siliceous catalysts heretofore proposed. The present invention furthermore provides a means whereby aluminosilicate materials having no internally available surfaces and only external particle surface areas can be readily converted to useful catalysts which thus broadens considerably their realm of practical utility.

The high activity catalysts contemplated herein are aluminosilicate compositions which are strongly acidic in character as a result of treatment with a fluid medium containing at least one metallic cation and a hydrogen ion or ion capable of conversion to a hydrogen ion. Inorganic and organic acids broadly represent the source of hydrogen ions; metallic salts the source of metal cations; and ammonium compounds the source of cations capable of conversion to hydrogen ions. The product resulting from treatment with the fluid medium is an activated crystalline and/or amorphous aluminosilicate in which the nuclear structure thereof has been modified solely to the extent of having protons and metallic cations chemisorbed or ionically bonded thereto. The activated aluminosilicate contains at least 0.5 equivalent and preferably contains more than 0.9 equivalent of ions of positive valence per gram atom of aluminum. Except for alkali metal cations which may be present as impurities to the extent of less than 0.25 equivalent per gram atom of aluminum, no other cations of metals of Group IA of the Periodic Table are associated with the aluminosilicate. When subsequently dried, washed and further used as an intermediate, this product has been found to be extremely active as a catalyst for hydrocarbon conversion.

In preparing the catalyst composition, the aluminosilicate can be contacted with a non-aqueous or aqueous fluid medium comprising a gas, polar solvent or water solution containing the desired hydrogen ion or ammonium ion capable of conversion to a hydrogen ion and at least one metallic salt soluble in the fluid medium. Alternatively, the aluminosilicate can be first contacted with a fluid medium containing a hydrogen ion or ammonium ion capable of conversion to a hydrogen ion and then with a fluid medium containing at least one metallic salt. Similarly, the aluminosilicate can be first contacted with a fluid medium containing at least one metallic salt and then with a fluid medium containing a hydrogen ion or an ion capable of conversion to a hydrogen ion or a mixture of both. Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion, metal cation, or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation, ammonium ion, or a mixture thereof, equivalent to a pH value ranging from less than 1.0 up to a pH value of about 12.0. Within these limits, pH values for fluid media containing a metallic cation and/or an ammonium ion range from 4.0 to 10.0, and are preferably between a pH value of 4.5 to 8.5. For fluid media containing a hydrogen ion alone or with a metallic cation, the pH values range from less than 1.0 up to about 7.0, and are preferably within the range of less than 1.0 up to 4.5. Where the molar ratio of the aluminosilicate is greater than about 2.2 and less than about 5.0, the pH value for the fluid media containing a hydrogen ion or a metal cation ranges from 3.8 to 8.5. Where ammonium ions are employed, either alone or in combination with metallic cations, the pH value ranges from 4.5 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion.

In carrying out the treatment with the fluid medium, the procedure employed comprises contacting the aluminosilicate with the desired fluid medium or media until such time as metallic cations originally present in the aluminosilicate are virtually exhausted. Cations of metals of Group IA of the Periodic Table, if present in the modified aluminosilicate, tend to suppress or limit catalytic properties, the activity of which, as a general rule, decreases with increasing content of these metallic cations. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or nonaqueous solution, may be passed slowly through a fixed bed of the aluminosilicate. If desired, hydrothermal treatment or a correspondingly non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid $$(NH(SO_3H)_2)$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxylamine disulfonic acid (), nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, maleic aid, fumaric acid, itaconic acid, citraconic acid, mesaconic acid, glutonic acid, muconic acid, ethylidene malonic acid, isoprypylidene malonic acid, allyl malonic acid.

Representative aromatic and cycloaliphatic monocarboxylic, dicarboxylic and polycarboxylic acids include 1,2-cyclohexane-dicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho, meta and para-methyl, hydroxyl, chloro, bromo and nitro-substituted benzoic acids, phenylacetic acid, mandelic acid, benzylic acid, hippuric acid, benzenesulfonic acid, toluenesulfonic acid, methanesulfonic acid and the like.

Other sources of hydrogen ions include carboxy polyesters prepared by the reaction of an excess polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium hydroxide, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartarate and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, etc.

A wide variety of metallic compounds can be employed with facility as a source of metallic cations and include both inorganic and organic salts of the metals of Group IB through Group VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartarates and the like. The only limitations on the particular metal salt or salts employed are that it be soluble in the fluid medium in which it is used and compatible with the hydrogen ion source, especially if both the metallic salt and the hydrogen ion source are in the same fluid medium. The preferred salts are the chlorides, nitrates, acetates and sulfates.

Of the wide variety of metallic salts which can be employed, the most preferred are salts of trivalent metals, then of divalent metals and lastly, of monovalent metals. Of the divalent metals, the preferred ones are of Group IIA of the Periodic Table. The particularly preferred salts are those of the rare earth metals including cerium, lanthanum, praseodymium, neodymium, illinium, samarium, europium, gadolinium, terbium, dysprosium, holmium, erbium, thulium, ytterbium and lutecium.

The rare earth salts employed can either be the salt of a single metal or preferably of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight and other rare earth oxides 0.8% by weight. Didymium chloride is also a mixture of rare earth chlorides, but having a low cerium content. It consists of the following rare earths determined as oxides: lanthanum, 45–46% by weight; cerium 1–2% by weight; praseodymium, 9–10% by weight, neodymium, 32–33% by weight; samarium, 5–6% by weight, gadolinium 3–4% by weight, yttrium, 0.4% by weight, other rare earths 1–2% by weight. It is to be understood that other mixtures of rare earths are equally applicable in the instant invention.

Representative metal salts which can be employed, aside from the mixtures mentioned above, include silver chloride, silver sulfate, silver nitrate, silver acetate, silver arsinate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, etc.

The aluminosilicates treated in accordance with the invention include a wide variety of aluminosilicates, both natural and synthetic, which have an amorphous or crystalline structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form the aluminosilicates may be represented by the formula:

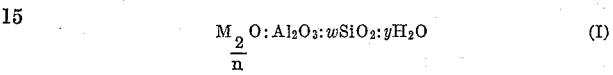

$$M_{2/n}O:Al_2O_3:wSiO_2:yH_2O \quad (I)$$

wherein M is a cation which balances the electrovalence of the tetrahedra, $n$ represents the valence of the cation, $w$ the moles of $SiO_2$, and $y$ the moles of $H_2O$. The cation may be any or more of a number of metal ions depending on whether the aluminosilicate is synthesized or occurs naturally. Typical cations include sodium, linthium, potassium, silver, magnesium, calcium, zinc, barium, iron and manganese. Although the proportions of inorganic oxides in the silicates and their spatial arrangement may vary, effecting distinct properties in the aluminosilicates, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework. In this respect, these characteristics are essential for obtaining catalyst compositions of high activity in accordance with the invention.

Representative materials include synthesized crystalline aluminosilicates, designated Zeolite X, which can be represented in terms of mole ratios of oxides as follows:

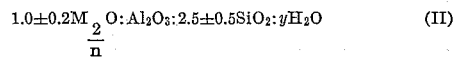

$$1.0\pm0.2M_{2/n}O:Al_2O_3:2.5\pm0.5SiO_2:yH_2O \quad (II)$$

wherein M is a cation having a valence of not more than three, $n$ represents the valence of M, and $y$ is a value up to eight depending on the identity of M and degree of hydration of the crystal. The sodium form may be represented in terms of mole ratios of oxides as follows:

$$0.9\ Na_2O:Al_2O_3:2.5\ SiO_2:6.1\ H_2O \quad (III)$$

Another synthesized crystalline aluminosilicate, designated Zeolite A, can be represented in mole ratios of oxide as:

$$1.0\pm0.2M_{2/n}O:Al_2O_3:1.85\pm0.5SiO_2:yH_2O \quad (IV)$$

wherein M represents a metal, $n$ is the valence of M, and $y$ is any value up to about 6. As prepared, Zeolite A contains primarily sodium cations and is designated sodium Zeolite A.

Other suitable synthesized crystalline aluminosilicates are those designated Zeolite Y, L and D.

The formula for Zeolite Y expressed in oxide mole ratios is:

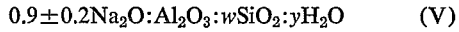

$$0.9\pm0.2Na_2O:Al_2O_3:wSiO_2:yH_2O \quad (V)$$

wherein $w$ is a value ranging from 3 to 6 and $y$ may be any value up to about 9.

The composition of Zeolite L in oxide mole ratios may be represented as:

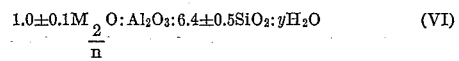

$$1.0\pm0.1M_{2/n}O:Al_2O_3:6.4\pm0.5SiO_2:yH_2O \quad (VI)$$

wherein M designates a metal, $n$ represents the valence of M, and $y$ is any value from 0 to 7.

The formula for Zeolite D, in terms of oxide mole ratios, may be represented as:

$$0.9 \pm 0.2[xNa_2O:(1-x)K_2O]:Al_2O_3:wSiO_2:yH_2O \quad (VII)$$

wherein x is a value of 0 to 1, w is from 4.5 to about 4.9, and y, in the fully hydrated form, is about 7.

Other synthetic crystalline aluminosilicates which can be used include those designated as Zeolite R, S, T, Z, E, F, Q and B.

The formula for Zeolite R in terms of oxide mole ratios may be written as follows:

$$0.9 \pm 0.2 Na_2O:Al_2O_3:wSiO_2:yH_2O \quad (VIII)$$

wherein w is from 2.45 to 3.65, and y, in the hydrated form, is about 7.

The formula for Zeolite S in terms of oxide mole ratios may be written as:

$$0.9 \pm 0.2 Na_2O:Al_2O_3:wSiO_2:yH_2O \quad (IX)$$

wherein w is from 4.6 to 5.9 and y, in the hydrated form, is about 6 to 7.

The formula for Zeolite T in terms of oxide mole ratios may be written as:

$$1.1 \pm 0.4xNa_2O:(1-x)K_2O:Al_2O_3:$$
$$6.9 + 0.5SiO_2:yH_2O \quad (X)$$

wherein x is any value from about 0.1 to about 0.8 and y is any value from about 0 to about 8.

The formula for Zeolite Z in terms of oxide mole ratios may be written as:

$$K_2O:Al_2O_3:2SiO_2:yH_2O \quad (XI)$$

wherein y is any value not exceeding 3.

The formula for Zeolite E in terms of oxide mole ratios may be written as:

$$0.9 \pm 0.1 M_{\frac{2}{n}}O:Al_2O_3:1.95 \pm 0.1 SiO_2:yH_2O \quad (XII)$$

wherein M is a cation, n is the valence of the cation, and y is a value of 0 to 4.

The formula for Zeolite F in terms of oxide mole ratios may be written as follows:

$$0.95 \pm 0.15 M_{\frac{2}{n}}O:Al_2O_3:2.05 \pm 0.3 SiO_2:yH_2O \quad (XIII)$$

wherein M is a cation, n is the valence of the cation, and y is any value from 0 to about 3.

The formula for Zeolite Z, expressed in terms of oxide mole ratios, may be written as:

$$0.95 \pm 0.05 M_{\frac{2}{n}}O:Al_2O_3:2.2 \pm 0.05 SiO_2:yH_2O \quad (XIV)$$

wherein M is a cation, n is the valence of the cation, and y is any value from 0 to 5.

The formula for Zeolite B may be written in terms of oxide mole ratios as:

$$1.0 \pm 0.2 M_{\frac{2}{n}}O:Al_2O_3:3.5 \pm 1.5 SiO_2:yH_2O \quad (XV)$$

wherein M represents a cation, n is the valence of the cation and y has an average value of 5.1 but may range from 0 to 6.

Other synthesized crystalline aluminosilicates include those designated as ZK–4 and ZK–5.

ZK–4 can be represented in terms of mole ratios of oxides as:

$$0.1 \text{ to } 0.3R:9.7 \text{ to } 1.0 M_{\frac{2}{n}}O:Al_2O_3:2.5 \text{ to } 4.0 SiO_2:yH_2O \quad (XVI)$$

wherein R is a member selected from the group consisting of methylammonium oxide, hydrogen oxide and mixtures thereof with one another, M is a metal cation, n is the valence of the cation, and y is any value from about 3.5 to about 5.5. As synthesized, Zeolite ZK–4 contains primarily sodium cations and can be represented by unit cell formula:

$$Na_{7.5 \pm 2}H_{2 \pm 0.5}^{9 \pm}AlO_2 \cdot 15 \pm 2 SiO_2$$

The major lines of the X-ray diffraction pattern of ZK–4 are set forth in the table below:

TABLE

| d Value of Reflection in A. | 100 I/I₀ |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK–4 can be prepared by preparing an aqueous solution of oxides containing as $Na_2O$, $Al_2O_3$, $SiO_2$, $H_2O$ and tetramethylammonium ion having a composition, in terms of oxide mole ratios, which falls within the following ranges:

| | |
|---|---|
| $SiO_2/Al_2O_3$ | 2.5 to 11 |
| $\dfrac{Na_2O}{Na_2O+[(CH_3)_4N]_2O}$ | 0.05 to 0.25 |
| $\dfrac{H_2O}{Na_2O+[(CH_3)_4N]_2O}$ | 25 to 50 |
| $\dfrac{Na_2O+[(CH_3)_4N]_2O}{SiO_2}$ | 1 to 2 | maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK–5 is representative of another crystalline aluminosilicate which is prepared in the same manner as Zeolite ZK–4 except that N,N'-dimethyltriethylenediammonium hydroxide is used in place of tetramethylammonium hydroxide. ZK–5 may be prepared from an aqueous sodium aluminosilicate mixture having the following composition expressed in terms of oxide mole ratios as:

| | |
|---|---|
| $SiO_2/Al_2O_3$ | 2.5 to 11 |
| $\dfrac{Na_2O}{Na_2O+[(CH_2)_6N_2(CH_3)_2]OH}$ | 0.05 to 0.25 |
| $\dfrac{H_2O}{Na_2O+[(CH_2)_6N_2(CH_3)_2]OH}$ | 25 to 50 |
| $\dfrac{Na_2O+[(CH_2)_6N_2(CH_3)_2]OH}{SiO_2}$ | 1 to 2 |

The N,N'-dimethyltriethylenediammonium hydroxide used in preparing ZK–5 can be prepared by methylating 1,4-diazobicyclo-(2.2.2)-octane with methyl iodide or dimethyl sulfate, followed by conversion to the hydroxide by treatment with silver oxide or barium hydroxide. The reaction may be illustrated as:

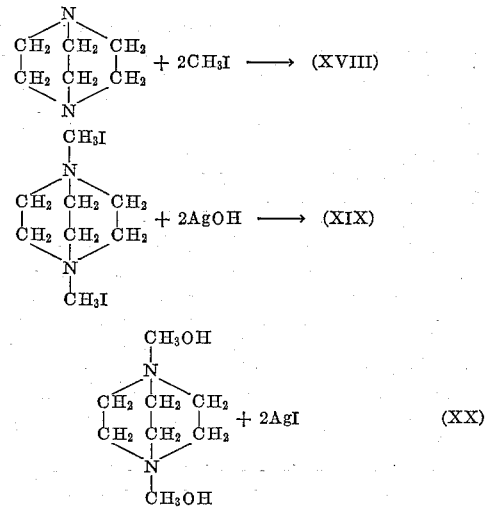

In using the N,N'-dimethyltriethylene-diammonium hydroxide compound in the preparation of ZK–5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Among the naturally occurring crystalline aluminosilicates which can be employed for purposes of the invention are included levynite, erionite, faujasite, analcite, paulingite, noselite, ferriorite, heulandite, scolecite, stilbite, clinoptilolite, harmotome, phillipsite, brewsterite, flakite, datolite, and aluminosilicates represented as follows:

Chabazite, $Na_2O.Al_2O_3.4SiO_2.6H_2O$
Gmelinite, $Na_2O.Al_2O_3.4SiO_2.6H_2O$
Cancrinite, $3(Na_2O.Al_2O_3.2SiO_2).Na_2CO_3$
Leucite, $K_2O.Al_2O_3.4SiO_2$
Lazurite, $(Na,Ca)_8Al_6Si_6O_24.2(S,Cl,So_4)$
Scapolite, $Na_4Al_3Si_9O_{24}.Cl$
Ptilolite, $Na_2O.Al_2O_3.10SiO_2.4H_2O$
Mesolite, $Na_2O.Al_2O_3.3SiO_2.2-3H_2O$
Mordenite, $Na_2O.Al_2O_3.10SiO_2.6.6H_2O$
Nepheline, $Na_2O.Al_2O_3.2SiO_2$
Natrolite, $Na_2O.Al_2O_3.3SiO_2.2H_2O$
Sodalite, $3(Na_2O.Al_2O_3.2SiO_2).2NaCl$ Other aluminosilicates which can be used are caustic treated clays.

Of the clay materials, montmorillonite and kaolin families are representative types which include the sub-bentonites, such as bentonite, and the kaolins commonly identified as Dixie, McNamee, Georgia and Florida clays in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

$Na_2O$/clay (dry basis) _____ 1.0–6.6 to 1
$SiO_2$/clay (dry basis) _____ 0.01–3.7 to 1
$H_2O/Na_2O$ (mole ratio) _____ 35–180 to 1

As previously noted, the active aluminosilicates used for purposes of the invention are characterized as having at least 0.5 equivalent of an ion of positive valence per gram atom of aluminum, as determined by base exchanging with other cations by recognized techniques. Aluminosilicate starting materials not possessing this characteristic, however, may be employed providing they are either pretreated or acquire this characteristic as a result of treatment with a fluid medium. As an example of pretreatment, argillaceous materials contacted with caustic or caustic-silica mixtures, as above described, results in the formation of amorphous and/or crystalline aluminosilicates having at least 0.5 equivalent, usually about 1.0 equivalent, or cation per gram atom of aluminum. Similarly, treatment of an amorphous silica-alumina composite with a fluid medium containing an ammonium ion capable of conversion to a hydrogen ion, for example, tetramethylammonium hydroxide, also results in an increase in the cation concentration per gram atom of aluminum to values above 0.5 equivalent.

The preparation of aluminosilicate compositions in accordance with the invention provides a means for obtaining exceptionally good catalysts. While the aluminosilicate component may contain varying amounts of silicon and aluminum, it has been found that extremely good results can be obtained through use of crystalline aluminosilicates having atomic ratios of silicon to aluminum greater than 1.1, preferably greater than 1.67, and more preferably above 2.7. Preferred aluminosilicates thus include natural materials such as gmelinite, chabazite and mordenite, and synthetic crystalline aluminosilicates such as Zeolites X, Y, T, ZK–4, and ZK–5.

The active aluminosilicate component prepared in the foregoing manner is combined, dispersed or otherwise intimately admixed with an inorganic oxide gel which serves as a base, binder, matrix or promoter, in such proportions that the resulting product contains from about 2 to 95% by weight and preferably about 5 to 50% by weight of the aluminosilicate in the final composite. The resulting aluminosilicate-inorganic oxide gel composition is then preferably precalcined in an inert atmosphere near the temperature contemplated for conversion but may be calcined initially during use in the conversion process. Generally, the catalyst composition is dried between 150° F. and 600° F., and thereafter calcined in air or an inert atmosphere of nitrogen, hydrogen, helium, flue gas or other inert gas at temperatures ranging from about 500° F. to 1500° F. for periods of time ranging from 1 to 48 hours or more. It is to be understood that the active aluminosilicate component can be calcined prior to incorporation with the inorganic oxide gel.

The aluminosilicate-inorganic oxide gel compositions can be prepared by several methods wherein the aluminosilicate having a particle size less than 40 microns, preferably within the range of 2 to 7 microns, is intimately admixed with the inorganic oxide gel while the latter is in a hydrous state such as in the form of a hydrosol, hydrogel, wet gelatinous precipitate, or a mixture thereof. Thus, finely divided active aluminosilicate can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or an alkaline coagulent. The hydrosol is then permitted to set in mass to a hydrogel which is thereafter dried and broken into pieces of desired shape, or dispersed through a nozzle into a bath of oil or other water-immiscible suspending medium to obtain spheroidally shaped "bead" particles of catalyst such as described in U.S. Patent No. 2,384,946. The aluminosilicate-siliceous gel thus obtained is washed free of soluble salts and thereafter dried and/or calcined as desired. The total alkali metal content of the resulting composite, including alkali metals which may be present in the aluminosilicate as an impurity, is less than about 4% and preferably less than about 3% by weight based on the total composition.

In a like manner, the active aluminosilicate may be incorporated with an aluminiferous oxide. Such gels are well known in the art and may be prepared, for example, by adding ammonium hydroxide, ammonium carbonate, etc., to a salt of nitrate, etc., in an amount sufficient to form aluminum hydroxide which upon drying is converted to alumina. The aluminosilicate may be incorporated with the aluminiferous oxide while the latter is in the form of hydrosol, hydrogel or wet gelatinous precipitate.

The inorganic oxide gel may also consist of a plural gel comprising a predominant amount of silica with one or more metals or oxides thereof selected from Groups IB, II, III, IV, V, VI, VII and VIII of the Periodic Table. Particular preference is given to plural gels of silica with metal oxides of Groups IIA, IIIB and IVA of the Periodic Table wherein the metal oxide is magnesia, alumina, zirconia, beryllia or thoria. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, lithium, nickel and their compounds as well as silica, alumina, or other siliceous oxide combination as fines.

As a further embodiment of the invention, aluminosilicate catalysts having exceptionally high orders of activity can be prepared by incorporating a metal aluminosilicate in an inorganic oxide gel matrix, and thereafter contacting the aluminosilicate with the above-mentioned fluid medium containing a hydrogen ion or ammonium ion capable of conversion to a hydrogen ion. The treatment is carried out for a sufficient period of time under conditions previously described for obtaining active aluminosilicates. It has been found that catalysts prepared in this manner are extremely active for hydrocarbon conversion, and particularly in the cracking of hydrocarbon oils wherein exceptionally high ratios of gasoline to low grade products, such as coke and gas, are obtained.

It has been further found in accordance with the invention that catalysts of improved activity and having other beneficial properties in the conversion of hydrocarbons are obtained by subjecting the treated aluminosilicate to a mild steam treatment carried out at elevated temperatures of 800° F. to 1500° F., preferably at temperatures of about 1000° F. to 1300° F. The treatment may be accomplished in an atmosphere of 100% steam or in an atmosphere consisting of steam and a gas which is substantially inert to the aluminosilcate. The steam treatment apparently provides beneficial properties in the aluminosilicate.

The high catalytic activities obtanied by alumnosilcate compositions prepared in accordance with the invention are illustrated in connection with the cracking of a representative hydrocarbon charge. In the examples hereinafter set forth, the reference catalyst employed consisted of a conventional silica-alumina "bead" type cracking catalyst. The silica-alumina catalyst contained about 10 weight percent $Al_2O_3$ and the remainder $SiO_2$. In some instances it also contained a trace amount of $Cr_2O_3$, i.e., about 0.15 weight percent.

The cracking activity of the catalyst is further illustrated by its ability to catalyze the conversion of a Mid-Continent gas oil having a boiling range of 450–950° F. to gasoline having an end point of 410° F. Vapors of the gas oil are passed through the catalyst at temperatures of 875° F. or 900° F. substantially at atmospheric pressure at a feed rate of 1.5 to 16.0 volumes of liquid oil per volume of catalyst per hour for ten minutes. The method of measuring the instant catalyst was to compare the various product yields obtained with such catalyst with yields of the same products given by conventional silica-alumina catalyst at the same conversion level. The differences (Δ values) shown hereinafter represent the yields given by the present catalyst minus yields given by the conventional catalyst. In these tests the catalyst composition of the invention was precalcined at about 1000° F. prior to their evaluation as a cracking catalyst.

Cracking operations carried out with the catalysts prepared in accordance with the invention may be effected at temperatures ranging from about 700° F. to 1200° F. under reduced atmospheric or superatmospheric pressure. The catalyst can be utilized in the form of spheroidal particles or beads disposed in a stationary bed, or in the fluid procedures wherein the catalyst is disposed in a reaction zone to which catalyst is continuously added and from which catalyst is continuously removed. A particularly effective cracking process can be achieved when the catalyst is used to obtain the inherent advantages realized in the moving bed technique referred to as the Thermofor catalytic cracking process.

*Example 1*

A synthetic crystalline aluminosilicate identified as Zeolite 13X was subjected to 12 two-hour treatments at 180° F. with an aqueous solution containing 5% by weight mixture of rare earth chlorides and 2% by weight of ammonium chloride. The aluminosilicate was then washed with water until there were no chloride ions in the effluent, dried, and then treated for 20 hours at 1225° F. with 100% atmospheric steam to yield a catalyst having a sodium content of 0.31 weight percent.

The following table shows the cracking data obtained when the catalyst was evaluated for cracking gas oil at 900° F.:

TABLE 1

Cracking data:
| | |
|---|---|
| Conversion, vol. percent | 60.9 |
| LHSV | 16 |
| 10 R.V.P. gaso., vol. percent | 54.6 |
| Excess $C_4$'s, vol. percent | 9.5 |
| $C_5+$ gasoline, vol. percent | 51.7 |
| Total $C_4$'s, vol. percent | 12.5 |
| Dry gas, wt. percent | 5.6 |
| Coke, wt. percent | 2.3 |
| $H_2$, wt. percent | 0.02 |

Δ advantage:
| | |
|---|---|
| 10 R.V.P., vol. percent | +9.3 |
| Excess $C_4$'s, vol. percent | −4.5 |
| $C_5+$ gasoline, vol. percent | +7.4 |
| Total $C_4$'s, vol. percent | −3.7 |
| Dry gas, wt. percent | −2.2 |
| Coke, wt. percent | −2.4 |

*Example 2*

The procedure of Example 1 was repeated with the exception that the crystalline aluminosilicate was subjected to a continuous treatment for 24 hours instead of 12 two-hour treatments. The following table shows the cracking data obtained with the catalyst was evaluated for cracking gas oil at 900° F.:

TABLE 2

Cracking data:
| | |
|---|---:|
| Conversion, vol. percent | 60.7 |
| LHSV | 16 |
| 10 R.V.P. gaso., vol. percent | 51.7 |
| Excess $C_4$'s, vol. percent | 11.2 |
| $C_5+$ gasoline, vol. percent | 49.2 |
| Total $C_4$'s, vol. percent | 13.7 |
| Dry gas, wt. percent | 6.4 |
| Coke, wt. percent | 3.0 |
| $H_2$, wt. percent | 0.03 |

Δ advantage:
| | |
|---|---:|
| 10 R.V.P. gaso., vol. percent | +6.5 |
| Excess $C_4$'s, vol. percent | −2.8 |
| $C_5+$ gasoline, vol. percent | +6.2 |
| Total $C_4$'s, vol. percent | −2.5 |
| Dry gas, wt. percent | −1.3 |
| Coke, wt. percent | −1.7 |

*Example 3*

A crystalline aluminosilicate identified as Zeolite 13X was subjected to three 2-hour treatments with a 5% by weight aqueous solution of ammonium chloride and then treated for 48 hours with an aqueous solution consisting of 5% by weight mixture of rare earth chlorides and 2% by weight of ammonium chloride. The aluminosilicate was then washed with water until there were no chloride ions in the effluent, dried and then treated for 24 hours at 1200° F. with steam at 15 p.s.i.g. to yield a catalyst having a sodium content of 0.2 weight percent.

*Example 4*

A synthetic crystalline aluminosilicate identified as Zeolite 13X was treated for 72 continuous hours with an aqueous solution containing 10% by weight of ammonium chloride, 10% by weight of ammonium acetate, and 1% by weight of rare earth chlorides. The aluminosilicate was then washed with water until there were no chloride or acetate ions in the effluent, dried and then treated for 24 hours at 1200° F. with steam at a pressure of 15 p.s.i.g.

The following table shows the cracking data obtained when the catalyst was evaluated for cracking gas oil at 900° F.:

TABLE 3

Cracking data:
| | |
|---|---:|
| Conversion, vol. percent | 56.6 |
| LHSV | 16 |
| 10 R.V.P. gaso., vol. percent | 50.9 |
| Excess $C_4$'s, vol. percent | 9.2 |
| $C_5+$ gasoline, vol. percent | 48.3 |
| Total $C_4$'s, vol. percent | 11.8 |
| Dry gas, wt. percent | 5.4 |
| Coke, wt. percent | 1.4 |
| $H_2$, wt. percent | 0.01 |

Δ advantage:
| | |
|---|---:|
| 10 R.V.P. gaso., vol. percent | +7.9 |
| Excess $C_4$'s, vol. percent | −3.4 |
| $C_5+$ gasoline, vol. percent | +7.4 |
| Total $C_4$'s, vol. percent | −3.0 |
| Dry gas, wt. percent | −1.6 |
| Coke, wt. percent | −2.5 |

*Example 5*

A synthetic crystalline aluminosilicate identified as Zeolite 13X was subjected to 24 two-hour treatments with an aqueous solution consisting of 5% by weight of lanthanum chloride and 2% by weight of ammonium chloride at 180° F. The aluminosilicate was then washed with water until there were no chloride ions in the effluent, dried and then treated for 20 hours at 1225° F. with 100% atmospheric steam to yield a catalyst having a sodium content of 0.36 weight percent.

The following table shows the cracking data obtained when the catalyst was evaluated for cracking gas oil at 900° F.:

TABLE 4

Cracking data:
| | |
|---|---:|
| Conversion, vol. percent | 63.1 |
| LHSV | 16 |
| 10 R.V.P. gaso., vol. percent | 52.6 |
| Excess $C_4$'s, vol. percent | 12.3 |
| $C_5+$ gasoline, vol. percent | 50.4 |
| Total $C_4$'s, vol. percent | 14.5 |
| Dry gas, wt. percent | 6.8 |
| Coke, wt. percent | 3.6 |
| $H_2$, wt. percent | 0.04 |

Δ advantage:
| | |
|---|---:|
| 10 R.V.P., vol. percent | +6.2 |
| Excess $C_4$'s, vol. percent | −2.7 |
| $C_5+$ gasoline, vol. percent | +6.2 |
| Total $C_4$'s, vol. percent | −2.5 |
| Dry gas, wt. percent | −1.4 |
| Coke, wt. percent | −1.5 |

*Example 6*

The procedure of Example 5 was repeated with the exception that the aluminosilicate was steamed for 24 hours at 1200° F. with steam at 15 p.s.i.g. The cracking data obtained when using this catalyst for cracking gas oil at 900° F. is shown in the following table.

TABLE 5

Cracking data:
| | |
|---|---:|
| Conversion, vol. percent | 65.9 |
| LHSV | 16 |
| 10 R.V.P. gaso., vol. percent | 56.5 |
| Excess $C_4$'s, vol. percent | 12.1 |
| $C_5+$ gasoline, vol. percent | 53.9 |
| Total $C_4$'s, vol. percent | 14.7 |
| Dry gas, wt. percent | 6.6 |
| Coke, wt. percent | 3.0 |
| $H_2$, wt. percent | 0.03 |

Δ advantage:
| | |
|---|---:|
| 10 R.V.P., vol. percent | +8.8 |
| Excess $C_4$'s, vol. percent | −3.9 |
| $C_5+$ gasoline, vol. percent | +8.4 |
| Total $C_4$'s, vol. percent | −3.3 |
| Dry gas, wt. percent | −2.1 |
| Coke, wt. percent | −2.7 |

*Example 7*

The procedure of Example 6 was repeated with the exception that 36 two-hour contacts of the lanthanum chloride and ammonium chloride solution were employed instead of 24 two-hour contacts. The resulting catalyst had a sodium content of 0.46 weight percent. Table 6 shows the cracking data obtained when the catalyst was evaluated for cracking gas oil at 900° F.

TABLE 6

Cracking data:
| | |
|---|---:|
| Conversion, vol. percent | 63.7 |
| LHSV | 16 |
| 10 R.V.P. gaso., vol. percent | 55.3 |
| Excess $C_4$'s, vol. percent | 8.1 |
| $C_5+$ gasoline, vol. percent | 51.8 |
| Total $C_4$'s, vol. percent | 11.6 |
| Dry gas, wt. percent | 7.6 |
| Coke, wt. percent | 3.1 |
| $H_2$, wt. percent | 0.03 |

Δ advantage:
| | |
|---|---:|
| 10 R.V.P., vol. percent | +8.7 |
| Excess $C_4$'s, vol. percent | −7.0 |
| $C_5+$ gasoline, vol. percent | +7.3 |
| Total $C_4$'s, vol. percent | −5.7 |
| Dry gas, wt. percent | −0.7 |
| Coke, wt. percent | −2.2 |

Example 8

A synthetic crystalline aluminosilicate identified as Zeolite 13X was treated with an aqueous solution containing 2% by weight mixture of rare earth chlorides for 18 continuous hours and then treated with an aqueous solution of ammonium sulfate containing 5% by weight of ammonium sulfate for 3 contacts of 16 hours each and then with 9 contacts of 2 hours each of the same solution. The treated aluminosilicate was washed with water until the effluent contained no chloride or sulfate ions, dried and then treated for 30 hours at 1200° F. with steam at 15 p.s.i.g. The resulting catalyst contained 0.12 weight percent sodium. The catalytic evaluation of the aluminosilicate for cracking gas oil at 900° F. is shown in the following table.

TABLE 7

Cracking data:
- Conversion, vol. percent _____ 37.5
- LHSV _____ 4
- 10 R.V.P. gaso., vol. percent _____ 32.5
- Excess $C_4$'s, vol. percent _____ 6.5
- $C_5+$ gasoline, vol. percent _____ 30.9
- Total $C_4$'s, vol. percent _____ 8.1
- Dry gas, wt. percent _____ 4.1
- Coke, wt. percent _____ 1.4
- $H_2$, wt. percent _____ 0.02

Δ advantage:
- 10 R.V.P., vol. percent _____ +0.1
- Excess $C_4$'s, vol. percent _____ −0.5
- $C_5+$ gasoline, vol. percent _____ +0.9
- Total $C_4$'s, vol. percent _____ −1.4
- Dry gas, wt. percent _____ +0.1
- Coke, wt. percent _____ −0.2

Example 9

A synthetic crystalline aluminosilicate identified as Zeolite Y was treated with an aqueous solution consisting of 5% by weight mixture of rare earth chlorides and 2% by weight of ammonium chloride and then washed with water until the effluent contained no chloride ions, dried and then treated for 24 hours at 1200° F. with 15 p.s.i.g. steam. The resulting aluminosilicate contained 0.52 weight percent sodium and gave the following results when tested for cracking gas oil at 900° F.

TABLE 8

Cracking data:
- Conversion, vol. percent _____ 61.6
- LHSV _____ 16
- 10 R.V.P. gaso., vol. percent _____ 54.9
- Excess $C_4$'s, vol. percent _____ 9.8
- $C_5+$ gasoline, vol. percent _____ 52.1
- Total $C_4$'s, vol. percent _____ 12.5
- Dry gas, wt. percent _____ 6.1
- Coke, wt. percent _____ 1.9
- $H_2$, wt. percent _____ 0.02

Δ advantage:
- 10 R.V.P., vol. percent _____ +9.0
- Excess $C_4$'s, vol. percent _____ −4.6
- $C_5+$ gasoline, vol. percent _____ +8.6
- Total $C_4$'s, vol. percent _____ −4.1
- Dry gas, wt. percent _____ −1.8
- Coke, wt. percent _____ −2.9

Example 10

The procedure of Example 9 was repeated with the exception that the solution consisted of 5% by weight of calcium chloride and 2% by weight of ammonium chloride. The catalytic evaluation for cracking gas oil at 900° F. is shown in the following table.

TABLE 9

Cracking data:
- Conversion, vol. percent _____ 61.8
- LHSV _____ 10
- 10 R.V.P. gaso., vol. percent _____ 57.0
- Excess $C_4$'s, vol. percent _____ 9.5
- $C_5+$ gasoline, vol. percent _____ 54.0
- Total $C_4$'s, vol. percent _____ 12.5
- Dry gas, wt. percent _____ 4.8
- Coke, wt. percent _____ 1.5
- $H_2$, wt. percent _____ 0.01

Δ advantage:
- 10 R.V.P., vol. percent _____ +11.2
- Excess $C_4$'s, vol. percent _____ −4.9
- $C_5+$ gasoline, vol. percent _____ +10.4
- Total $C_4$'s, vol. percent _____ −4.1
- Dry gas, wt. percent _____ −3.2
- Coke, wt. percent _____ −3.3

Example 11

The procedure of Example 9 was repeated with the exception that the treatment solution consisted of 5% by weight of lanthanum chloride and 2% by weight of ammonium chloride. The catalytic evaluation for cracking gas oil at 900° F. is shown in the following table:

TABLE 10

Cracking data:
- Conversion, vol. percent _____ 66.1
- LHSV _____ 16
- 10 R.V.P. gaso., vol. percent _____ 59.0
- Excess $C_4$'s, vol. percent _____ 9.3
- $C_5+$ gasoline, vol. percent _____ 55.7
- Total $C_4$'s, vol. percent _____ 12.6
- Dry gas, wt. percent _____ 7.0
- Coke, wt. percent _____ 2.3
- $H_2$, wt. percent _____ 0.02

Δ advantage:
- 10 R.V.P., vol. percent _____ +11.2
- Excess $C_4$'s, vol. percent _____ −6.9
- $C_5+$ gasoline, vol. percent _____ +10.1
- Total $C_4$'s, vol. percent _____ −5.7
- Dry gas, wt. percent _____ −1.7
- Coke, wt. percent _____ −3.4

Example 12

A synthetic crystalline aluminosilicate was prepared by mixing the following solutions:

(A) Sodium silicate solution:
- N-Brand sodium silicate [1] _____ 77.5 lbs.
- NaOH pellets _____ 11.0 lbs.
- Water _____ 143.0 lbs.
- Specific gravity _____ 1.172 at 68° F.

[1] 8.8 weight percent $Na_2O$, 28.5 weight percent $SiO_2$, 62.7 weight percent water.

(B) Sodium aluminate solution:
- Sodium aluminate _____ 25.6 lbs.
- Sodium hydroxide pellets _____ 11.0 lbs.
- Water _____ 195.0 lbs.
- Specific gravity _____ 1.140 at 68° F.

Solution (B) was added to solution (A) while agitating vigorously to break up the hydrogel as it formed into a creamy slurry. The slurry was heated for 12 hours at 205° F., filtered, washed to 11 pH and then dried in air at 280° F. to yield a crystalline aluminosilicate.

3.3 pounds of the aluminosilicate was treated with 4 batches of a 27.5% by weight aqueous solution of calcium chloride, each bath having 1 lb. of calcium chloride per pound of aluminosilicate. Three treatments were for 24 hours each at 180° F. and the fourth one was for 72 hours at room temperature. After the four treatments with the calcium chloride solution, the aluminosilicate was further treated four times with an aqueous solution containing 2% by weight of calcium chloride and 1% by weight of aluminum chloride for 4 contacts, 3 of which were for 2 hours and 1 was overnight, all 4 contacts being at room temperature. The aluminosilicate was then washed with water until the effluent contained no chloride ions, dried, pelleted to ½" size, ground to 4/10 mesh and calcined for 10 hours in air at 1000° F. The aluminosilicate catalyst was then treated with 100% steam at 1225° F. for 20 hours at atmospheric pressure. The resulting catalyst was evaluated for cracking gas oil at 875° F. and gave the following results.

TABLE 11

Cracking data:
  Conversion, vol. percent _____ 64.3
  LHSV _____ 7.5
  $C_5+$ gaso., vol. percent _____ 53.5
  Total $C_4$'s, vol. percent _____ 12.7
  Total dry gas, wt. percent _____ 5.0
  Coke, wt. percent _____ 4.6

Δ advantage:
  $C_5+$ gaso., vol. percent _____ +11.8
  Total $C_4$'s, vol. percent _____ − 8.4
  Total dry gas, wt. percent _____ − 3.6
  Coke, wt. percent _____ −1.0

*Example 13*

A synthetic crystalline aluminosilicate identified as Zeolite 4A was treated three times for 24 hours and one time for 72 hours with a 26 weight percent aqueous solution of calcium chloride at 180° F. After the treatment with calcium chloride, the aluminosilicate was then treated for three two-hour contacts and one overnight contact at room temperature with an aqueous solution consisting of 2% by weight of calcium chloride and 1% by weight ammonium chloride. The aluminosilicate was then washed with water until the effluent contained no chloride ions, dried, calcined for 10 hours at 1000° F. in air, and then treated with steam for 20 hours at 1225° F. to yield a catalyst having a sodium content of 0.6 percent by weight.

*Example 14*

A synthetic crystalline aluminosilicate identified as Zeolite 5A was treated with a chloroplatinic acid solution containing 2.0 grams platinum and an ammonium hydroxide solution containing 28% by weight ammonia. The aluminosilicate was washed with water until the effluent contained no chloride ions, dried and then treated for 20 hours at 1225° F. with atmospheric steam to yield an aluminosilicate having excellent catalytic properties.

*Example 15*

1800 grams of a crystalline aluminosilicate identified as Zeolite 13X was treated with a solution consisting of cerium chloride and ammonium hydroxide. The treatment was carried out at a temperature of 160–180° F. for ½ hour after which time the slurry was filtered and then the operation repeated for another ½ hour. The resulting aluminosilicate contained 0.81 weight percent sodium and 24.7 weight percent cerium.

*Example 16*

66.5 grams of a synthetic crystalline aluminosilicate identified as Zeolite 5A was pelleted and treated with 26.6 grams of ammonium nitrate dissolved in 1 gallon of distilled water. The product was rinsed with distilled water until the effluent contained no nitrate ions and then calcined at 650–700° F. for several hours in a stream of nitrogen. The resulting aluminosilicate analyzed at 9.08 weight percent calcium.

*Example 17*

A natural crystalline aluminosilicate identified as gmelinite was crushed to a particle size of less than 32 mesh and calcined in air for 2 hours at 650° F. 5 grams of the calcined crushed gmelinite was treated 10 times with 10 cc. of a solution containing 4% by weight mixture of rare earth chlorides and 1% by weight ammonium chloride. Each of the treatments was for 1 hour at a temperature of 173–186° F. The aluminosilicate was then washed with water until the effluent contained no chloride ions, dried overnight at 190° F., pelleted, recrushed to a particle size of less than 12 mesh and calcined for three hours at 900° F. in air. The resulting product was employed as a catalyst for the cracking of decane at a catalyst concentration of 3.3 cc., at a feed rate of 3.0 LHSV, and temperature of 900° F. A conversion of 91.6% by weight was obtained.

*Example 18*

The procedure of Example 17 was repeated with the exception that ptilolite was employed instead of gmelinite. When the the resulting catalyst was used to crack decane, it gave a conversion of 58.7% by weight.

*Example 19*

The procedure of Example 17 was repeated with the exception that the aluminosilicate employed was identified as chabazite. The resulting catalyst gave a conversion of 95% by weight when employed to crack decane.

*Example 20*

A synthetic crystalline aluminosilicate, identified as Zeolite 13X, was subjected to 12 two-hour treatments at 180° F. with an aqueous solution containing 5% by weight mixture of rare earth chlorides and 2% by weight of ammonium chloride. The aluminosilicate was then treated with a 10% by weight aqueous solution of ammonium carbonate for 4 hours at 180° F. The resulting modified aluminosilicate was then washed with water until there were no chloride or carbonate ions in the effluent, dried and then treated for 24 hours at 1200° F. with steam at 15 p.s.i.g. to yield a catalyst having a sodium content of 0.65 weight percent.

The following table shows the cracking data obtained when the catalyst was evaluated for cracking gas oil at 900° F.:

TABLE 12

Cracking data:
  Conversion, vol. percent _____ 43.4
  LHSV _____ 8
  10 R.V.P. gaso., vol. percent _____ 40.9
  Excess $C_4$'s, vol. percent _____ 5.8
  $C_5+$ gasoline, vol. percent _____ 38.6
  Total $C_4$'s, vol. percent _____ 8.2
  Dry gas, wt. percent _____ 3.6
  Coke, wt. percent _____ 0.9
  $H_2$, wt. percent _____ 0.02

Δ advantage:
  10 R.V.P., vol. percent _____ +5.1
  Excess $C_4$'s, vol. percent _____ −2.9
  $C_5+$ gasoline, vol. percent _____ +5.1
  Total $C_4$'s, vol. percent _____ −2.8
  Dry gas, wt. percent _____ −1.3
  Coke, wt. percent _____ −1.12

*Example 21*

The procedure of Example 20 was repeated with the exception that a 10% by weight aqueous solution of ammonium phosphate was employed instead of the ammonium carbonate. The resulting catalyst had a sodium content of 0.5 weight percent and the cracking data shown in the following table when used at 900° F.:

TABLE 13

Cracking data:

| | |
|---|---|
| Conversion, vol. percent | 42.2 |
| LHSV | 16 |
| 10 R.V.P. gaso., vol. percent | 35.1 |
| Excess $C_4$'s, vol. percent | 7.7 |
| $C_5+$ gasoline, vol. percent | 33.5 |
| Total $C_4$'s, vol. percent | 9.3 |
| Dry gas, wt. percent | 4.7 |
| Coke, wt. percent | 2.1 |
| $H_2$, wt. percent | 0.02 |

*Example 22*

5 parts by weight of the synthetic crystalline aluminosilicate identified as Zeolite 13X was incorporated into 95 parts by weight of a silica-alumina matrix consisting of 94 weight percent of $SiO_2$ and 4 weight percent of $Al_2O_3$. The resulting composition was then treated with an aqueous solution containing 1% by weight mixture of rare earth chlorides and 1% by weight of ammonium chloride for 12 contacts of 2 hours each. The treated aluminosilicate was then washed with water until there were no chloride ions in the effluent, dried and treated for 24 hours at 1200° F. with steam at 15 p.s.i.g. to yield a catalyst having a sodium content of 0.07 weight percent.

The following table shows the cracking data obtained when the catalyst was evaluated for cracking gas oil at 900° F.:

TABLE 14

Cracking data:

| | |
|---|---|
| Conversion, vol. percent | 50.5 |
| LHSV | 4 |
| 10 R.V.P. gaso., vol. percent | 45.0 |
| Excess $C_4$'s, vol. percent | 8.7 |
| $C_5+$ gasoline, vol. percent | 42.7 |
| Total $C_4$'s, vol. percent | 11.0 |
| Dry gas, wt. percent | 4.7 |
| Coke, wt. percent | 1.6 |
| $H_2$, wt. percent | 0.04 |

Δ advantage:

| | |
|---|---|
| 10 R.V.P., vol. percent | +5.1 |
| Excess $C_4$'s, vol. percent | −2.0 |
| $C_5+$ gasoline, vol. percent | +5.2 |
| Total $C_4$'s, vol. percent | −2.0 |
| Dry gas, wt. percent | −1.4 |
| Coke, wt. percent | −1.4 |

*Example 23*

The procedure of Example 22 was repeated with the exception that one contact of 24 continuous hours was employed instead of 12 two-hour contacts. The sodium content of the resulting aluminosilicate was 0.1 weight percent and it had the cracking data shown in the following table when employed at a temperature of 900° F.:

TABLE 15

Cracking data:

| | |
|---|---|
| Conversion, vol. percent | 51.5 |
| LHSV | 4 |
| 10 R.V.P. gaso., vol. percent | 45.8 |
| Excess $C_4$'s, vol. percent | 9.4 |
| $C_5+$ gasoline, vol. percent | 43.5 |
| Total $C_4$'s, vol. percent | 11.7 |
| Dry gas, wt. percent | 4.7 |
| Coke, wt. percent | 1.5 |
| $H_2$, wt. percent | 0.03 |

Δ advantage:

| | |
|---|---|
| 10 R.V.P., vol. percent | +5.3 |
| Excess $C_4$'s, vol. percent | −1.6 |
| $C_5+$ gasoline, vol. percent | +5.3 |
| Total $C_4$'s, vol. percent | −1.6 |
| Dry gas, wt. percent | −1.6 |
| Coke, wt. percent | −1.7 |

*Example 24*

25 parts by weight of a crystalline aluminisolicate identified as Zeolite 13X was dispersed in 75 parts by weight of silicon dioxide and the resulting composition treated for 24 continuous hours with an aqueous solution consisting of 1% by weight mixture of rare earth chlorides and 1% by weight of ammonium chloride. The aluminosilicate was then washed with water, until there were no chloride ions in the effluent, dried and then treated for 24 hours at a temperature of 1200° F. with steam at 15 p.s.i.g. to yield a catalyst having the cracking data shown in the following table when evaluated for cracking gas oil at 900° F.:

TABLE 16

Cracking data:

| | |
|---|---|
| Conversion, vol. percent | 61.5 |
| LHSV | 4 |
| 10 R.V.P. gaso., vol. percent | 53.8 |
| Excess $C_4$'s, vol. percent | 9.8 |
| $C_5+$ gasoline, vol. percent | 50.9 |
| Total $C_4$'s, vol. percent | 12.6 |
| Dry gas, wt. percent | 5.9 |
| Coke, wt. percent | 3.0 |
| $H_2$, wt. percent | 0.02 |

Δ advantage:

| | |
|---|---|
| 10 R.V.P., vol. percent | +8.2 |
| Excess $C_4$'s, vol. percent | −4.6 |
| $C_5+$ gasoline, vol. percent | +7.5 |
| Total $C_4$'s, vol. percent | −3.9 |
| Dry gas, wt. percent | −1.9 |
| Coke, wt. percent | −1.7 |

*Example 25*

The procedure of Example 24 was repeated with the exception that the composition was first treated with a 2% by weight aqueous solution of a mixture of rare earth chlorides for 16 continuous hours, washed and then treated with a 1% by weight aqueous solution of ammonium chloride for 24 continuous hours. The resulting catalyst contained 4.35 weight percent rare earths, determined as rare earth oxide, and had the cracking data shown in the following table:

TABLE 17

Cracking data:

| | |
|---|---|
| Conversion, vol. percent | 48.4 |
| LHSV | 4 |
| 10 R.V.P. gaso., vol. percent | 44.6 |
| Excess $C_4$'s, vol. percent | 6.5 |
| $C_5+$ gasoline, vol. percent | 42.1 |
| Total $C_4$'s, vol. percent | 9.0 |
| Dry gas, wt. percent | 4.6 |
| Coke, wt. percent | 1.3 |
| $H_2$, wt. percent | 0.02 |

Δ advantage:

| | |
|---|---|
| 10 R.V.P., vol. percent | +5.8 |
| Excess $C_4$'s, vol. percent | −3.5 |
| $C_5+$ gasoline, vol. percent | +5.6 |
| Total $C_4$'s, vol. percent | −3.5 |
| Dry gas, wt. percent | −1.1 |
| Coke, wt. percent | −1.4 |

*Example 26*

10 parts by weight of a synthetic crystalline aluminosilicate identified as Zeolite 13X was dispersed into 90 parts by weight of a silica alumina matrix consisting of 93% by weight $SiO_2$ and 7% by weight of $Al_2O_3$. The composition was then treated for one two-hour contact with a 1% by weight aqueous solution of rare earth chlorides, washed and then subjected to one 24 hour continuous contact with an aqueous solution consisting of 2% by weight of calcium chloride and 1% by weight of ammonium chloride. The aluminosilicate was then washed with water until there were no chloride ions in the effluent, dried and then treated for 20 hours at 1225° F. with 1% atmospheric steam to yield a catalyst having a sodium content of 0.1% by weight, a calcium content of 2.2% by weight, and a rare earth content, determined as rare earth oxides, of 5.1% by weight.

The following table shows cracking data obtained when the catalyst was evaluated for cracking gas oil at 900° F.:

TABLE 18

Cracking data:
| | |
|---|---|
| Conversion, vol. percent | 51.1 |
| LHSV | 4 |
| 10 R.V.P. gaso., vol. percent | 44.5 |
| Excess $C_4$'s, vol. percent | 8.8 |
| $C_5+$ gasoline, vol. percent | 42.4 |
| Total $C_4$'s, vol. percent | 10.9 |
| Dry gas, wt. percent | 4.8 |
| Coke, wt. percent | 2.2 |

Δ advantage:
| | |
|---|---|
| 10 R.V.P., vol. percent | +4.3 |
| Excess $C_4$'s, vol. percent | −2.1 |
| $C_5+$ gasoline, vol. percent | +4.4 |
| Total $C_4$'s, vol. percent | −2.3 |
| Dry gas, wt. percent | −1.4 |
| Coke, wt. percent | −0.4 |

*Example 27*

The procedure of Example 26 was repeated with the exception that 2 two-hour contacts of a rare earth chloride mixture were employed instead of 1 two-hour contact. The resulting aluminosilicate had a sodium content of 0.1% by weight, a calcium content of 1.8% by weight, and a rare earth content, determined as rare earth oxides, of 7.7% by weight.

The following table shows the cracking data of the catalyst when evaluated for cracking gas oil at 900° F.:

TABLE 19

Cracking data:
| | |
|---|---|
| Conversion, vol. percent | 53.7 |
| LHSV | 4 |
| 10 R.V.P. gaso., vol. percent | 46.1 |
| Excess $C_4$'s, vol. percent | 9.9 |
| $C_5+$ gasoline, vol. percent | 43.9 |
| Total $C_4$'s, vol. percent | 12.1 |
| Dry gas, wt. percent | 5.1 |
| Coke, wt percent | 2.8 |

Δ advantage:
| | |
|---|---|
| 10 R.V.P., vol. percent | +4.5 |
| Excess $C_4$'s, vol. percent | −1.8 |
| $C_5+$ gasoline, vol. percent | +4.6 |
| Total $C_4$'s, vol. percent | −1.9 |
| Dry gas, wt. percent | −1.5 |
| Coke, wt. percent | −0.7 |

*Example 28*

10 parts by weight of a synthetic crystalline aluminosilicate identified as Zeolite 13X was dispersed in 90 parts by weight of a silica alumina matrix consisting of 93% $SiO_2$ and 7% $Al_2O_3$. The composition was then treated for 24 continuous hours with a 1% by weight solution of a mixture of rare earth chloride and a 1% by weight solution of ammonium chloride. The aluminosilicate was then washed with water until there was no chloride ions in the effluent, dried and then treated for 30 hours at 1200° F. with steam at a pressure of 15 p.s.i.g. to yield a catalyst having a sodium content of 0.09% by weight and a rare earth content determined as rare earth oxides, of 0.92% by weight.

The following table shows the cracking data of the catalyst when evaluated for cracking gas oil at 900° F.:

TABLE 20

Cracking data:
| | |
|---|---|
| Conversion, vol. percent | 54.8 |
| LHSV | 4 |
| 10 R.V.P. gaso., vol. percent | 48.3 |
| Excess $C_4$'s, vol. percent | 9.1 |
| $C_5+$ gasoline, vol. percent | 45.8 |
| Total $C_4$'s, vol. percent | 11.5 |
| Dry gas, wt. percent | 4.8 |
| Coke, wt. percent | 2.5 |
| $H_2$, wt. percent | 0.03 |

Δ advantage:
| | |
|---|---|
| 10 R.V.P., vol., percent | +6.1 |
| Excess $C_4$'s, vol. percent | −2.9 |
| $C_5+$ gasoline, vol. percent | +6.0 |
| Total $C_4$'s, vol. percent | −2.7 |
| Dry gas, wt. percent | −1.9 |
| Coke, wt. percent | −1.1 |

*Example 29*

10 parts by weight of a synthetic crystalline aluminosilicate identified as Zeolite 13X was dispersed into 90 parts of a silica alumina matrix and the composition was treated with an aqueous solution containing 2% by weight of a mixture of rare earth chlorides for 24 continuous hours. The aluminosilicate was then washed and treated with a 1% by weight aqueous solution of ammonium sulfate for three 16 hour contacts and then for 9 two-hour contacts with the same solution. The aluminosilicate was then washed with water until there were no chloride or sulfate ions in the effluent, dried and then treated for 30 hours at 1200° F. with steam at a pressure of 15 p.s.i.g. to yield a catalyst having a sodium content of 0.17% by weight and a rare earths content, determined as rare earth oxides, of 4.5% by weight.

The following table shows the cracking data of the catalyst when evaluated for cracking gas oil at 900° F.:

TABLE 21

Cracking data:
| | |
|---|---|
| Conversion, vol. percent | 57.4 |
| LHSV | 4 |
| 10 R.V.P. gaso., vol. percent | 48.3 |
| Excess $C_4$'s, vol. percent | 11.1 |
| $C_5+$ gasoline, vol. percent | 46.2 |
| Total $C_4$'s, vol. percent | 13.3 |
| Dry gas, wt. percent | 6.0 |
| Coke, wt. percent | 2.5 |
| $H_2$, wt. percent | 0.02 |

Δ advantage:
| | |
|---|---|
| 10 R.V.P., vol. percent | +4.8 |
| Excess $C_4$'s, vol. percent | −1.7 |
| $C_5+$ gasoline, vol. percent | +4.8 |
| Total $C_4$'s, vol. percent | −1.8 |
| Dry gas, wt. percent | −1.3 |
| Coke, wt. percent | −1.6 |

*Example 30*

10 parts by weight of a crystalline synthetic aluminosilicate identified as Zeolite 13X was dispersed into 90 parts of a silica alumina matrix and the composition was treated with an aqueous solution consisting of 1% by weight of didynium chloride and 1% by weight of ammonium chloride for 24 continuous hours. The aluminosilicate was then washed with water until there were no chloride ions in the effluent, dried and then treated for 24 hours at 1200° F., with steam at a pressure of 15 p.s.i.g. to yield a catalyst having 8.77% by weight of rare earths, determined as rare earth oxides.

The following table shows the cracking data of the catalyst when evaluated for cracking gas oil at 900° F.:

TABLE 22

Cracking data:
- Conversion, vol. percent _____ 63.1
- LHSV _____ 4
- 10 R.V.P gaso., vol. percent _____ 52.7
- Excess C$_4$'s, vol. percent _____ 11.8
- C$_5$+ gasoline, vol. percent _____ 50.1
- Total C$_4$'s, vol. percent _____ 14.4
- Dry gas, wt. percent _____ 7.1
- Coke, wt. percent _____ 3.3
- H$_2$, wt. percent _____ 0.18

Δ advantage:
- 10 R.V.P., vol. percent_____ +6.2
- Excess C$_4$'s, vol. percent_____ −3.2
- C$_5$+ gasoline, vol. percent_____ +5.9
- Total C$_4$'s, vol. percent_____ −2.6
- Dry gas, wt. percent_____ −1.1
- Coke, wt. percent_____ −1.8

*Example 31*

The procedure of Example 30 was repeated with the exception that a 2% by weight solution of didynium chloride was employed for 16 continuous hours and then a 1% by weight solution of ammonium chloride was employed for 24 continuous hours. The cracking data of the resulting catalyst is shown in the following table:

TABLE 23

Cracking data:
- Conversion, vol. percent _____ 58.6
- LHSV _____ 4
- 10 R.V.P. gaso., vol. percent _____ 50.8
- Excess C$_4$'s, vol. percent _____ 11.1
- C$_5$+ gasoline, vol. percent _____ 48.6
- Total C$_4$'s, vol. percent _____ 13.3
- Dry gas, wt. percent _____ 5.6
- Coke, wt. percent _____ 2.1
- H$_2$, wt. percent _____ 0.04

Δ advantage:
- 10 R.V.P., vol. percent_____ +6.7
- Excess C$_4$'s, vol. percent_____ −2.1
- C$_5$+ gasoline, vol. percent_____ +6.7
- Total C$_4$'s, vol. percent_____ −2.2
- Dry gas, wt. percent_____ −1.8
- Coke, wt. percent_____ −2.1

*Example 32*

25 parts by weight of a synthetic crystalline aluminosilicate identified as Zeolite 13X was dispersed in 75 parts of a silica alumina matrix and the resulting composition treated with a 2% by weight solution of calcium chloride for 8 continuous hours, followed by treatment with an aqueous solution consisting of 2% by weight of calcium chloride and 0.5% by weight of ammonium chloride for 16 continuous hours and then treated with a 2% by weight aqueous solution of rare earth chlorides for 2 contacts each of 2 hours. The aluminosilicate was then washed with water until there was no chloride ions in the effluent, dried and then treated for 20 hours at 1225° F. with 1% atmospheric steam to yield a catalyst having calcium content of 2.15% by weight and a rare earths content, determined as rare earth oxides, of 7.2% by weight.

The following table shows the cracking data of the catalyst when evaluated for cracking gas oil at 900° F.:

TABLE 24

Cracking data:
- Conversion, vol. percent _____ 57.3
- LHSV _____ 4
- 10 R.V.P. gaso., vol. percent _____ 46.1
- Excess C$_4$'s, vol. percent _____ 11.3
- C$_5$+ gasoline, vol. percent _____ 43.3
- Total C$_4$'s, vol. percent _____ 14.1
- Dry gas, wt. percent _____ 6.1
- Coke, wt. percent _____ 4.0
- H$_2$, wt. percent _____ 0.03

Δ advantage:
- 10 R.V.P., vol. percent_____ +2.7
- Excess C$_4$'s, vol. percent_____ −1.6
- C$_5$+ gasoline, vol. percent_____ +2.0
- Total C$_4$'s, vol. percent_____ −1.0
- Dry gas, wt. percent_____ −0.6
- Coke, wt. percent_____ −0.1

*Example 33*

25 parts by weight of a synthetic crystalline aluminosilicate identified as Zeolite 13X was dispersed in 75 parts by weight of a silica alumina matrix and the resulting composition treated with an aqueous solution consisting of 2% by weight mixture of rare earth chlorides and 0.5% by weight of acetic acid for 12 contacts each being two hours in duration. The aluminosilicate was then washed with water until there were no chloride or acetate ions in the effluent, dried and then treated for 20 hours at 1225° F. with a 100% atmospheric steam to yield a catalyst having a rare earths content, determined as rare earth oxides, of 3.17.

The following table shows the cracking data of the catalyst when evaluated for cracking gas oil at 900° F.:

TABLE 25

Cracking data:
- Conversion, vol. percent _____ 43.0
- LHSV _____ 4
- 10 R.V.P. gaso., vol. percent _____ 34.3
- Excess C$_4$'s, vol. percent _____ 9.6
- C$_5$+ gasoline, vol. percent _____ 32.6
- Total C$_4$'s, vol. percent _____ 11.1
- Dry gas, wt. percent_____ 5.1
- Coke, wt. percent _____ 2.4
- H$_2$, wt. percent _____ 0.02

*Example 34*

25 parts by weight of a synthetic crystalline aluminosilicate identified as Zeolite 13X was dispersed into 75 parts of a silica alumina matrix and the resulting composition treated with an aqueous solution consisting of 2% by weight of calcium chloride and 1% by weight of ammonium chloride for 2 treatments of 2 hours each. The aluminosilicate was then washed with water until there were no chloride ions in the effluent, dried and then treated for 20 hours at 1225° F. with 100° atmospheric steam to yield a catalyst having a sodium content of 0.69 and a calcium content of 3.44.

The following table shows the cracking data of the catalyst when evaluated for cracking gas oil at 900° F.:

TABLE 26

Cracking data:
- Conversion, vol. percent _____ 48.3
- LHSV _____ 4
- 10 R.V.P. gaso., vol. percent _____ 46.6
- Excess C$_4$'s, vol. percent _____ 4.0
- C$_5$+ gasoline, vol. percent _____ 43.2
- Total C$_4$'s, vol. percent _____ 7.4
- Dry gas, wt. percent _____ 4.1
- Coke, wt. percent _____ 1.5
- H$_2$, wt. percent _____ 0.02

Δ advantage:
- 10 R.V.P., vol. percent _____ +7.9
- Excess C₄'s, vol. percent _____ —6.0
- C₅+ gasoline, vol. percent _____ +6.8
- Total C₄'s, vol. percent _____ —4.0
- Dry gas, wt. percent _____ —1.6
- Coke, wt. percent _____ —1.2

*Example 35*

The procedure of Example 34 was repeated with the exception that 12 two-hour contacts of treating solution were employed instead of 2 two-hour contacts. The sodium content of the resulting aluminosilicate was 0.17% by weight and the calcium content was 3.24% by weight. The cracking data of the catalyst are shown in the following table:

TABLE 27

Cracking data:
- Conversion, vol. percent _____ 66.1
- LHSV _____ 4
- 10 R.V.P. gaso., vol. percent _____ 55.7
- Excess C₄'s, vol. percent _____ 13.0
- C₅+ gasoline, vol. percent _____ 53.3
- Total C₄'s, vol. percent _____ 15.7
- Dry gas, wt. percent _____ 7.0
- Coke, wt. percent _____ 2.8
- H₂, wt. percent _____ 0.03

Δ advantage:
- 10 R.V.P., vol. percent _____ +7.9
- Excess C₄'s, vol. percent _____ —3.0
- C₅+ gasoline, vol. percent _____ +7.0
- Total C₄'s, vol. percent _____ —2.8
- Dry gas, wt. percent _____ —1.7
- Coke, wt. percent _____ —2.9

*Example 36*

10 parts by weight of a synthetic crystalline aluminosilicate identified as Zeolite 13X was dispersed into 90 parts by weight of a silica alumina matrix and the resulting composition was treated with a 2% aqueous solution of lanthanum chloride for one continuous 16 hour contact and then treated with a 1% solution of ammonium chloride for 24 continuous hours. The aluminosilicate was then washed with water until there was no chloride ions in the effluent, dried and then treated for 24 hours at 1200° F. with steam at 15 p.s.i.g. to yield a catalyst having a lanthanum oxide content of 5.92.

The following table shows the cracking data of the catalyst when evaluated for cracking gas oil at 900° F.:

TABLE 28

Cracking data:
- Conversion, vol. percent _____ 59.9
- LHSV _____ 4
- 10 R.V.P. gaso., vol. percent _____ 51.0
- Excess C₄'s, vol. percent _____ 7.9
- C₅+ gasoline, vol. percent _____ 47.8
- Total C₄'s, vol. percent _____ 11.1
- Dry gas, wt. percent _____ 7.3
- Coke, wt. percent _____ 3.4
- H₂, wt. percent _____ 0.03

Δ advantage:
- 10 R.V.P., vol. percent _____ +6.2
- Excess C₄'s, vol. percent _____ —5.9
- C₅+ gasoline, vol. percent _____ +5.2
- Total C₄'s, vol. percent _____ —4.8
- Dry gas, wt. percent _____ —0.3
- Coke, wt. percent _____ —1.1

*Example 37*

10 parts by weight of a rare earth synthetic aluminosilicate prepared by reacting Zeolite 13X with a rare earth chloride solution was dispersed in a silica alumina matrix and the resulting composition was treated with a solution consisting of 2% by weight of calcium chloride and 1% by weight of ammonium chloride for 24 continuous hours. The aluminosilicate was then washed with water until there were no chloride ions in the effluent, dried and then treated for 20 hours at 1225° F. with 100% atmospheric steam to yield a catalyst having a sodium content of 0.12 weight percent, calcium content of 2.5 weight percent, and a rare earths content, determined as rare earth oxides, of 2.4 weight percent.

The following table shows the cracking data of the catalyst when evaluated for cracking gas oil at 900° F.:

TABLE 29

Cracking data:
- Conversion, vol. percent _____ 46.2
- LHSV _____ 4
- 10 R.V.P. gaso., vol. percent _____ 37.1
- Excess C₄'s, vol. percent _____ 9.3
- C₅+ gasoline, vol. percent _____ 35.4
- Total C₄'s, vol. percent _____ 11.0
- Dry gas, wt. percent _____ 5.4
- Coke, wt. percent _____ 3.0
- H₂, wt. percent _____ 0.03

*Example 38*

The procedure of Example 37 was repeated with the exception that the treating solution was a 1% by weight solution of ammonium chloride instead of a solution of calcium and ammonium chlorides. The resulting catalyst contained 0.11% by weight sodium and 2.05% by weight rare earths and had the cracking data listed in the following table:

TABLE 30

Cracking data:
- Conversion, vol. percent _____ 59.9
- LHSV _____ 4
- 10 R.V.P. gaso., vol. percent _____ 49.2
- Excess C₄'s, vol. percent _____ 13.1
- C₅+ gasoline, vol. percent _____ 47.5
- Total C₄'s, vol. percent _____ 14.9
- Dry gas, wt. percent _____ 6.3
- Coke, wt. percent _____ 2.6
- H₂, wt. percent _____ 0.02

Δ advantage:
- 10 R.V.P., vol. percent _____ +4.4
- Excess C₄'s, vol. percent _____ —0.7
- C₅+ gasoline, vol. percent _____ +5.0
- Total C₄'s, vol. percent _____ —1.1
- Dry gas, wt. percent _____ —1.4
- Coke, wt. percent _____ —1.9

*Example 39*

10 parts by weight of a cerium aluminosilicate prepared by reacting an aluminosilicate identified as Zeolite 13X with a solution of cerium chloride was dispersed into a silica alumina matrix and the resulting composition was treated with a 1% by weight solution of ammonium chloride for 24 continuous hours. The aluminosilicate was then washed with water until there were no chloride ions in the effluent, dried and then treated for 24 hours at 1200° F. with steam at 15 p.s.i.g. to yield a catalyst having a cerium content of 2.2% by weight.

The following table shows the cracking data for the catalyst when evaluated for cracking gas oil at 900° F.:

TABLE 31

Cracking data:
- Conversion, vol. percent _____ 51.1
- LHSV _____ 4
- 10 R.V.P. gaso., vol. percent _____ 44.1
- Excess C₄'s, vol. percent _____ 9.1
- C₅+ gasoline, vol. percent _____ 42.0
- Total C₄'s vol. percent _____ 11.2
- Dry gas, wt. percent _____ 4.9
- Coke, wt. percent _____ 2.4
- H₂, wt. percent _____ 0.02

TABLE 31—Continued

Δ advantage:
- 10 R.S.V., vol. percent +4.0
- Excess $C_4$'s, vol. percent −1.8
- $C_5+$ gasoline, vol. percent +4.0
- Total $C_4$'s, vol. percent −1.9
- Dry gas, wt. percent −1.3
- Coke, wt. percent −0.6

Example 40

The procedure of Example 39 was repeated with the exception that the cerium aluminosilicate dispersed in the matrix was first treated with a 2% by weight solution of cerium chloride for 16 hours and then with a 1% by weight solution of ammonium chloride for 24 continuous hours. The resulting catalyst contained 6.6% by weight of cerium and its cracking data is shown in the following table when evaluated for cracking gas oil at 900° F.:

TABLE 32

Cracking data:
- Conversion, vol. percent 54.3
- LHSV 4
- 10 R.S.V. gas., vol. percent 45.4
- Excess $C_4$'s, vol. percent 10.7
- $C_5+$ gasoline, vol. percent 43.5
- Total $C_4$'s, vol. percent 12.6
- Dry gas, wt. percent 5.4
- Coke, wt. percent 3.0
- $H_2$, wt. percent 0.02

Δ advantage:
- 10 R.S.V., vol. percent +3.4
- Excess $C_4$'s, vol. percent −1.2
- $C_5+$ gasoline, vol. percent +3.7
- Total $C_4$'s, vol. percent −1.6
- Dry gas, wt. percent −1.3
- Coke, wt. percent −0.6

Example 41

10 parts by weight of a lanthanum aluminosilicate prepared by reacting Zeolite 13X with a 5% by weight lanthanum chloride at 180° F. for one two-hour contact was dispersed in a silica alumina matrix and the resulting composition treated with a 1% by weight solution of ammonium chloride for 24 continuous hours. The aluminosilicate was then washed with water, dried and then treated for 24 hours at 1200° F. with steam at 15 p.s.i.g. to yield a catalyst having a rare earth content of 0.52% by weight, determined as rare earth oxides.

Example 42

The procedure of Example 41 was repeated with the exception that the aluminosilicate in the matrix was first treated with a 2% by weight solution of lanthanum chloride for 16 hours prior to the treatment with the 1% by weight solution of ammonium chloride for 24 hours. The resulting catalyst had a lanthanum content of 6.1% by weight and its cracking data is shown in the following table when evaluated for cracking gas oil at 900° F.:

TABLE 33

Cracking data:
- Conversion, vol. percent 60.5
- LHSV 4
- 10 R.V.P. gaso., vol. percent 51.5
- Excess $C_4$'s, vol. percent 12.2
- $C_5+$ gasoline, vol. percent 49.1
- Total $C_4$'s, vol. percent 14.5
- Dry gas, wt. percent 6.0
- Coke, wt. percent 2.0
- $H_2$, wt. percent 0.02

Δ advantage:
- 10 R.V.P., vol. percent +6.5
- Excess $C_4$'s, vol. percent −1.8
- $C_5+$ gasoline, vol. percent +6.1
- Total $C_4$'s, vol. percent −1.5
- Dry gas, wt. percent −1.7
- Coke, wt. percent −2.6

Example 43

The procedure of Example 38 was repeated with the exception that the matrix was $SiO_2$ instead of a silica alumina matrix. The resulting catalyst had a rare earth content of 3.7% by weight.

Example 44

The procedure of Example 39 was repeated with the exception that the matrix was $SiO_2$ instead of silica alumina. The resulting catalyst had a rare earth content of 5.3% by weight.

Example 45

The procedure of Example 41 was repeated with the exception that the matrix was $SiO_2$ instead of silica alumina. The resulting aluminosilicate had a rare earth content of 3.7% by weight.

Example 46

The procedure of Example 42 was repeated with the exception that the matrix was $SiO_2$ instead of silica alumina. The resulting catalyst had a rare earth content of 9.1% by weight.

Example 47

25 parts by weight of a synthetic crystalline calcium aluminosilicate was dispersed into 75 parts by weight of a silica alumina matrix and the resulting composition treated with a 2% aqueous solution of rare earth chlorides for 16 continuous hours and then with a 1% by weight solution of ammonium chloride for 24 continuous hours. The aluminosilicate was washed with water until the effluent contained no chloride ions and then treated for 24 hours at 1200° F. with steam at 15 p.s.i.g. to yield a catalyst having a rare earth content, determined as rare earth oxides, of 4.97% by weight.

The following table shows the cracking data for the catalyst when evaluated for cracking gas oil at 900° F.:

TABLE 34

Cracking data:
- Conversion, vol. percent 51.5
- LHSV 4
- 10 R.V.P. gaso., vol. percent 49.3
- Excess $C_4$'s, vol. percent 8.0
- $C_5+$ gasoline, vol. percent 47.0
- Total $C_4$'s, vol. percent 10.3
- Dry gas, wt. percent 6.1
- Coke, wt. percent 2.1
- $H_2$, wt. percent 0.01

Δ advantage:
- 10 R.V.P., vol. percent +8.9
- Excess $C_4$'s, vol. percent −3.0
- $C_5+$ gasoline, vol. percent +9.0
- Total $C_4$'s, vol. percent −3.0
- Dry gas, wt. percent −0.2
- Coke, wt. percent −1.0

Example 48

10 parts by weight of a crystalline aluminosilicate identified as Zeolite 13X was dispersed into 90 parts by weight of a silica lanthanum matrix containing 98.5% by weight of $SiO_2$ and 1.5% by weight of lanthanum oxides. The resulting composition was treated with a 2% aqueous solution of lanthanum chloride for 16 continuous hours and then with a 1% solution of ammonium chloride for 24 continuous hours. The aluminosilicate was then washed with water until there were no chloride ions in the effluent, dried and then treated for 24 hours at 1200° F. with steam at a pressure of 15 p.s.i.g. to yield a catalyst having a rare earth content of 9.32% by weight.

Example 49

10 parts by weight of a synthetic crystalline aluminosilicate identified as Zeolite 13X was dispered into 90 parts by weight of a silica rare earth oxide matrix consisting of 97% by weight of $SiO_2$ and 3% by weight of rare earth oxides. The resulting compositon was treated with an aqueous solution consisting of 2% by weight of a mixture of rare earth chlorides for 16 hours and then with a 1% by weight solution of ammonium chloride for 24 continuous hours. The resulting aluminosilicate was washed with water until the effluent contained no chloride ions, dried and then treated for 24 hours at 1200° F. at 15 p.s.i.g. with steam to yield a catalyst having a rare earth content of 7.8% by weight, determined as rare earth oxides.

*Example 50*

10 parts by weight of a synthetic crystalline aluminosilicate identified as Zeolite 13X was dispersed into 90 parts by weight of a silica didynium matrix consisting of 97% by weight $SiO_2$ and 3% by weight didynium oxides. The resulting composition was then treated for 16 continuous hours with an aqueous solution consisting of 2% by weight of lanthanum chloride and then for 24 continuous hours with 1% by weight aqueous solution of ammonium chloride. The aluminosilicate was then washed with water until the effluent contained no chloride ions, dried and then treated for 24 hours at 1200° F. with steam at 15 p.s.i.g. to yield a catalyst having a rare earth content of 7.79% by weight, determined as rare earth oxides.

The resulting catalyst had the cracking data shown in the following table when evaluated for cracking gas oil at 900° F.:

TABLE 35

Cracking data:
| | |
|---|---|
| Conversion, vol. percent | 53.3 |
| LHSV | 4 |
| 10 R.V.P. gaso., vol. percent | 47.8 |
| Excess $C_4$'s, vol. percent | 7.8 |
| $C_5+$ gasoline, vol. percent | 45.3 |
| Total $C_4$'s, vol. percent | 10.3 |
| Dry gas, wt. percent | 5.1 |
| Coke, wt. percent | 2.0 |
| $H_2$, wt. percent | 0.05 |

Δ advantage:
| | |
|---|---|
| 10 R.V.P., vol. percent | +6.4 |
| Excess $C_4$'s, vol. percent | −5.4 |
| $C_5+$ gasoline, vol. percent | +6.2 |
| Total $C_4$'s, vol. percent | −5.1 |
| Dry gas, wt. percent | −1.4 |
| Coke, wt. percent | −1.4 |

*Example 51*

The procedure of Example 50 was repeated with the exception that a 2% by weight aqueous solution of didynium chloride was employed instead of the lanthanum chloride. The resulting catalyst had a sodium content of 0.5% by weight and a rare earth content of 11.2% by weight, and the cracking data shown in the following table:

TABLE 36

Cracking data:
| | |
|---|---|
| Conversion, vol. percent | 48.1 |
| LHSV | 4 |
| 10 R.V.P. gaso., vol. percent | 43.4 |
| Excess $C_4$'s, vol. percent | 6.6 |
| $C_5+$ gasoline, vol. percent | 44.0 |
| Total $C_4$'s, vol. percent | 9.1 |
| Dry gas, wt. percent | 4.7 |
| Coke, wt. percent | 1.6 |
| $H_2$, wt. percent | 0.08 |

Δ advantage:
| | |
|---|---|
| 10 R.V.P., vol. percent | +4.9 |
| Excess $C_4$'s, vol. percent | −3.4 |
| $C_5+$ gasoline, vol. percent | +4.8 |
| Total $C_4$'s, vol. percent | −3.2 |
| Dry gas, wt. percent | −1.0 |
| Coke, wt. percent | −1.0 |

*Example 52*

10 parts by weight of a synthetic crystalline aluminosilicate identified as Zeolite 13X was dispersed in 90 parts by weight of a silica alumina lanthanum matrix consisting of 91% by weight $SiO_2$, 3% by weight $Al_2O_3$, and 6% by weight of lanthanum oxides. The resulting composition was treated with a 1% by weight aqueous solution of lanthanum chloride and then with a 1% by weight solution of ammonium chloride, each treatment being for 24 continuous hours. The aluminosilicate was then washed with water until the effluent contained no chloride ions, dried and then treated for 24 hours at 1200° F. with steam at 15 p.s.i.g. to yield a catalyst having a sodium content of 0.15% by weight, and a rare earth content of 11.5% by weight, determined as rare earth oxides.

The cracking data of the resulting catalyst are shown in the following table, when the catalyst was evaluated for cracking gas oil at 900° F.:

TABLE 37

Cracking data:
| | |
|---|---|
| Conversion, vol. percent | 54.0 |
| LHSV | 4 |
| 10 R.V.P. gaso., vol. percent | 49.8 |
| Excess $C_4$'s, vol. percent | 7.5 |
| $C_5+$ gasoline, vol. percent | 46.9 |
| Total $C_4$'s, vol. percent | 10.4 |
| Dry gas, wt. percent | 4.8 |
| Coke, wt. percent | 1.8 |
| $H_2$, wt. percent | 0.01 |

Δ advantage:
| | |
|---|---|
| 10 R.V.P., vol. percent | +8.0 |
| Excess $C_4$'s, vol. percent | −5.9 |
| $C_5+$ gasoline, vol. percent | +7.4 |
| Total $C_4$'s, vol. percent | −5.2 |
| Dry gas, wt. percent | −2.7 |
| Coke, wt. percent | −2.6 |

*Example 53*

10 parts by weight of a crystalline aluminosilicate identified as Zeolite Y was dispersed into 90 parts by weight of a silica alumina matrix and the resulting composition was treated for 16 continuous hours with an aqueous solution comprising a 2% by weight mixture of rare earth chlorides and then for 24 continuous hours with a 1% by weight aqueous ammonium chloride solution. The aluminosilicate was then washed with water until the effluent contained no chloride ions, dried and then treated for 24 hours at 1200° F. with steam at 15 p.s.i.g. to yield a catalyst having a rare earth content of 3.35 weight percent.

The cracking data of the resulting catalyst is shown in the following table when evaluated for cracking gas oil at 900° F.:

TABLE 38

Cracking data:
| | |
|---|---|
| Conversion, vol. percent | 58.2 |
| LHSV | 4 |
| 10 R.V.P., gaso., vol. percent | 50.8 |
| Excess $C_4$'s, vol. percent | 10.6 |
| $C_5+$ gasoline, vol. percent | 48.3 |
| Total $C_4$'s, vol. percent | 13.1 |
| Dry gas, wt. percent | 5.4 |
| Coke, wt. percent | 2.0 |
| $H_2$, wt. percent | 0.01 |

Δ advantage:
| | |
|---|---|
| 10 R.V.P., vol. percent | +6.8 |
| Excess $C_4$'s, vol. percent | −2.5 |
| $C_5+$ gasoline, vol. percent | +6.5 |
| Total $C_4$'s, vol. percent | −2.3 |
| Dry gas, wt. percent | −1.9 |
| Coke, wt. percent | −2.2 |

Example 54

The procedure of Example 53 was repeated with the exception that a 2% by weight aqueous solution of lanthanum chloride was employed instead of the rare earth chloride solution. The resulting catalyst had a lanthanum content of 3.9 weight percent determined as lanthanum oxide.

The cracking data of the resulting catalyst is shown in the following table:

TABLE 39

Cracking data:

| | |
|---|---|
| Conversion, vol. percent | 61.8 |
| LHSV | 4 |
| 10 R.V.P. gaso., vol. percent | 54.0 |
| Excess $C_4$'s, vol. percent | 11.1 |
| $C_5+$ gasoline, vol. percent | 51.5 |
| Total $C_4$'s, vol. percent | 13.7 |
| Dry gas, wt. percent | 5.8 |
| Coke, wt. percent | 2.0 |
| $H_2$, wt. percent | 0.02 |

Δ advantage:

| | |
|---|---|
| 10 R.V.P., vol. percent | +8.2 |
| Excess $C_4$'s, vol. percent | −3.3 |
| $C_5+$ gasoline, vol. percent | +8.0 |
| Total $C_4$'s, vol. percent | −2.8 |
| Dry gas, wt. percent | −2.2 |
| Coke, wt. percent | −2.8 |

Examples 55–67 illustrate the use of clays which have been treated with caustic admixture with a source of silica, such as sand, silica gel or sodium silicate, calcined at temperatures ranging from 350° F. to 1600° F., crushed, dispersed in water and digested.

Example 55

10% by weight of a McNamee clay which had been caustic treated was dispersed in 90 parts by weight of a silica alumina matrix. The resulting composition was treated with a 2% aqueous solution of lanthanum chloride for 16 continuous hours and then with a 1% by weight solution of ammonium chloride for 24 continuous hours. The resulting aluminosilicate was washed with water until the effluent contained no chloride ions, dried and then treated for 24 hours at 1200° F. with steam at 15 p.s.i.g. to yield a catalyst having a lanthanum content of 5.15, determined as lanthanum oxide.

The following table shows the cracking data of the catalyst when evaluated for cracking gas oil at 900° F.:

TABLE 40

Cracking data:

| | |
|---|---|
| Conversion, vol. percent | 54.2 |
| LHSV | 4 |
| 10 R.V.P. gaso., vol. percent | 48.8 |
| Excess $C_4$'s, vol. percent | 9.8 |
| $C_5+$ gasoline, vol. percent | 46.6 |
| Total $C_4$'s, vol. percent | 11.9 |
| Dry gas, wt. percent | 4.8 |
| Coke, wt. percent | 1.4 |
| $H_2$, wt. percent | 0.04 |

Δ advantage:

| | |
|---|---|
| 10 R.V.P., vol. percent | +6.9 |
| Excess $C_4$'s, vol. percent | −2.0 |
| $C_5+$ gasoline, vol. percent | +7.0 |
| Total $C_4$'s, vol. percent | −2.1 |
| Dry gas, wt. percent | −1.9 |
| Coke, wt. percent | −2.1 |

Example 56

The process of Example 55 was repeated with the exception that the matrix was a silica gel instead of the silica alumina employed. The resulting aluminosilicate catalyst had a lanthanum oxide content of 6.06% by weight.

Example 57

10 parts by weight of a caustic treated McNamee clay was dispersed into a silica lanthanum matrix consisting of 97 parts by weight of $SiO_2$ and 3 parts by weight of lanthanum oxide. The resulting composition was subjected to a 24 hour continuous treatment with an aqueous solution consisting of 1% by weight lanthanum chloride and 1% by weight ammonium chloride. The aluminosilicate was then washed with water until the effluent contained no chloride ions, dried and then treated for 24 hours at 1200° F. with steam at 15 p.s.i.g. to yield a catalyst having a lanthanum content of 10.2% by weight, determined as lanthanum oxide.

Example 58

25 parts by weight of caustic treated McNamee clay was dispersed in 75 parts by weight of a silica lanthanum matrix consisting of 97% by weight of silica and 3% by weight of lanthanum oxide. The resulting composition was then treated with a 2% solution of didynium chloride for 16 continuous hours and then with a 1% solution of ammonium chloride for 24 hours. The resulting aluminosilicate was then washed with water until the effluent contained no chloride ions, dried and then treated for 24 hours at 1200° F. with steam at 15 p.s.i.g. to yield a catalyst having a rare earth content of 9.45% by weight, determined as rare earth oxides.

The following table shows the cracking data of the catalyst when evaluated for cracking gas oil at 900° F.:

TABLE 41

Cracking data:

| | |
|---|---|
| Conversion, vol. percent | 61.6 |
| LHSV | 4 |
| 10 R.V.P. gaso., vol. percent | 53.3 |
| Excess $C_4$'s, vol. percent | 10.8 |
| $C_5+$ gasoline, vol. percent | 50.7 |
| Total $C_4$'s, vol. percent | 13.4 |
| Dry gas, wt. percent | 5.9 |
| Coke, wt. percent | 2.5 |
| $H_2$, wt. percent | 0.11 |

Δ advantage:

| | |
|---|---|
| 10 R.V.P., vol. percent | +7.6 |
| Excess $C_4$'s, vol. percent | −3.6 |
| $C_5+$ gasoline, vol. percent | +7.2 |
| Total $C_4$'s, vol. percent | −3.1 |
| Dry gas, wt. percent | −2.0 |
| Coke, wt. percent | −2.3 |

Example 59

10 parts by weight of a caustic treated bentonite clay was dispersed in 90 parts of a silica alumina matrix and the resulting composition was subjected to a 16 hour continuous treatment with an aqueous solution consisting of 2% by weight of lanthanum chloride and then with a 1% aqueous solution of ammonium chloride for 24 continuous hours. The resulting aluminosilicate was then washed with water until the effluent contained no chloride ions, dried and then treated for 24 hours at 1200° F. to obtain a catalyst having a lanthanum content of 5.66% by weight.

The following table shows the cracking data of the catalyst when evaluated for cracking gas oil at 900° F.:

TABLE 42

Cracking data:

| | |
|---|---|
| Conversion, vol. percent | 51.1 |
| LHSV | 4 |
| 10 R.V.P. gaso., vol. percent | 44.6 |
| Excess $C_4$'s, vol. percent | 8.7 |
| $C_5+$ gasoline, vol. percent | 42.3 |
| Total $C_4$'s, vol. percent | 10.9 |
| Dry gas, wt. percent | 5.4 |
| Coke, wt. percent | 1.5 |
| $H_2$, wt. percent | 0.11 |

TABLE 42—Continued

Δ advantage:

| | |
|---|---|
| 10 R.V.P., vol. percent | +4.5 |
| Excess C₄'s, vol. percent | −2.3 |
| C₅+ gasoline | +4.3 |
| Total C₄'s, vol. percent | −2.3 |
| Dry gas, wt. percent | −0.8 |
| Coke, wt. percent | −1.6 |

Example 60

10 parts by weight of halloysite clay which had been caustic treated was dispersed in 90 parts by weight of a silica alumina matrix and the resulting composition treated with a 2% by weight aqueous solution of a mixture of rare earth chlorides for 16 hours and then with a 1% by weight aqueous solution of ammonium chloride for 24 continuous hours. The aluminosilicate was then washed with water until the effluent contained no chloride ions, dried and then treated for 24 hours at 1200° F. with steam at a pressure of 15 p.s.i.g. to yield a catalyst having a rare earth content of 6.08.

The following table shows the cracking data of the catalyst when evaluated for cracking gas oil at 900° F.:

TABLE 43

Cracking data:

| | |
|---|---|
| Conversion, vol. percent | 57.6 |
| LHSV | 4 |
| 10 R.V.P. gaso., vol. percent | 50.6 |
| Excess C₄'s, vol. percent | 10.9 |
| C₅+ gasoline, vol. percent | 48.3 |
| Total C₄'s, vol. percent | 13.4 |
| Dry gas, wt. percent | 5.3 |
| Coke, wt. percent | 1.7 |
| H₂, wt. percent | 0.03 |

Δ advantage:

| | |
|---|---|
| 10 R.V.P., vol. percent | +7.0 |
| Excess C₄'s, vol. percent | −2.1 |
| C₅+ gasoline, vol. percent | +6.8 |
| Total C₄'s, vol. percent | −1.7 |
| Dry gas, wt. percent | −2.0 |
| Coke, wt. percent | −2.5 |

Example 61

The procedure of Example 60 was repeated with the exception that a 2% by weight aqueous solution of lanthanum chloride was employed instead of the rare earth chloride solution. The resulting catalyst had a lanthanum content of 6.82% by weight and the cracking data shown in the following table:

TABLE 44

Cracking data:

| | |
|---|---|
| Conversion, vol. percent | 58.4 |
| LHSV | 4 |
| 10 R.V.P. gaso., vol. percent | 49.3 |
| Excess C₄'s, vol. percent | 11.3 |
| C₅+ gasoline, vol. percent | 47.0 |
| Total C₄'s, vol. percent | 13.6 |
| Dry gas, wt. percent | 6.3 |
| Coke, wt. percent | 2.0 |
| H₂, wt. percent | 0.03 |

Δ advantage:

| | |
|---|---|
| 10 R.V.P., vol. percent | +5.3 |
| Excess C₄'s, vol. percent | −1.9 |
| C₅+ gasoline, vol. percent | +5.2 |
| Total C₄'s, vol. percent | −1.8 |
| Dry gas, wt. percent | −1.1 |
| Coke, wt. percent | −2.3 |

Example 62

25 parts by weight of a caustic treated Dixie clay was dispersed into a silica alumina matrix and the composition was treated with an aqueous solution consisting of 1% by weight of a mixture of rare earth chlorides and 1% by weight ammonium chloride for 24 continuous hours. The aluminosilicate was then washed with water until the effluent contained no chloride ions, dried and then treated for 20 hours at 1225° F. with 100% atmospheric steam to yield a catalyst having a sodium content of 0.56% by weight and a rare earth content of 8.2% by weight, determined as rare earth oxides.

The following table shows the cracking data of the catalyst when evaluated for cracking gas oil at 900° F.:

TABLE 45

Cracking data:

| | |
|---|---|
| Conversion, vol. percent | 46.2 |
| LHSV | 4 |
| 10 R.V.P. gaso., vol. percent | 40.0 |
| Excess C₄'s, vol. percent | 7.3 |
| C₅+ gasoline, vol. percent | 37.7 |
| Total C₄'s, vol. percent | 9.6 |
| Dry gas, wt. percent | 4.7 |
| Coke, wt. percent | 2.6 |
| H₂, wt. percent | 0.22 |

Δ advantage:

| | |
|---|---|
| 10 R.V.P., vol. percent | +2.5 |
| Excess C₄'s, vol. percent | −2.2 |
| C₅+ gasoline, vol. percent | +2.6 |
| Total C₄'s, vol. percent | −2.2 |
| Dry gas, wt. percent | −0.7 |
| Coke, wt. percent | +0.2 |

Example 63

25 parts by weight of a caustic treated Dixie clay was dispersed into a silica alumina matrix and the resulting composition was subjected to 4 two-hour treatments with a 2% aqueous solution of calcium chloride and then to 8 two-hour treatments with a solution consisting of 2% by weight of calcium chloride and 1% by weight of ammonium chloride. The resulting aluminosilicate was then washed with water until the effluent contained no chloride ions, dried and then treated for 20 hours at 1225° F. with 100% atmospheric steam to yield a catalyst having a calcium content of 3.88% by weight.

Example 64

McNamee clay,[1] an aluminosilicate which had been caustic treated, was subjected to treatment with an aqueous solution consisting of 5% by weight of a mixture of rare earth chlorides and 2% by weight ammonium chloride. The aluminosilicate was then washed with water until the effluent contained no chloride ions and treated for 20 hours at 1225° F. with steam at atmospheric pressure. The resulting aluminosilicate was evaluated for cracking gas oil at 900° F. and gave the following results:

TABLE 46

Cracking data:

| | |
|---|---|
| Conversion, vol. percent | 57.2 |
| LHSV | 16 |
| 10 R.V.P. gaso., vol. percent | 49.9 |
| Excess C₄'s, vol. percent | 9.5 |
| C₅+ gasoline, vol. percent | 47.4 |
| Total C₄'s, vol. percent | 12.0 |
| Dry gas, wt. percent | 5.6 |
| Coke, wt. percent | 2.8 |
| H₂, wt. percent | 0.05 |

Δ advantage:

| | |
|---|---|
| 10 R.V.P., vol. percent | +6.5 |
| Excess C₄'s, vol. percent | −3.2 |
| C₅+ gasoline, vol. percent | +6.2 |
| Total C₄'s, vol. percent | −3.0 |
| Dry gas, wt. percent | −1.6 |
| Coke, wt. percent | −1.2 |

---

[1] Al₂O₃—39.85 wt. percent, SiO₂—44.9 wt. percent, Fe₂O₃—0.35 wt. percent, TiO₂—0.73 wt. percent, CaO—trace, MgO—trace, Na₂O—0.12 wt. percent, K₂O—0.10 wt. percent.

Example 65

Dixie clay,[2] an aluminosilicate, which had been caustic treated, was treated with an aqueous solution consisting of 5% by weight mixture of rare earth chlorides and 2% by weight of ammonium chloride for 2 treatments of 24 hours each. The aluminosilicate was then washed with water until the effluent contained no chloride ions, dried and treated with steam for 20 hours at 1225° F. at atmospheric pressure.

The catalytic evaluation of the resulting aluminosilicate is shown in the following table for cracking gas oil at 900° F.:

TABLE 47

Cracking data:
  Conversion, vol. percent _____ 36.9
  LHSV _____ 10
  10 R.V.P. gaso., vol. percent _____ 36.2
  Excess $C_4$'s, vol. percent _____ 2.0
  $C_5$+ gasoline, vol. percent _____ 33.7
  Total $C_4$'s, vol. percent _____ 4.5
  Dry gas, wt. percent _____ 3.5
  Coke, wt. percent _____ 1.8
  $H_2$, wt. percent _____ 0.15

Δ advantage:
  10 R.V.P., vol. percent _____ +4.2
  Excess $C_4$'s, vol. percent _____ −5.0
  $C_5$+ gasoline, vol. percent _____ +4.0
  Total $C_4$'s, vol. percent _____ −4.8
  Dry gas, wt. percent _____ −0.5
  Coke, wt. percent _____ +0.3

Example 66

Bentonite, an aluminosilicate, which had been caustic treated, was treated with an aqueous solution consisting of 5% by weight of a mixture of rare earth chlorides and 2% by weight of ammonium chloride. The treated aluminosilicate was then washed with water until there was no chloride ions in the effluent, dried and then treated with steam for 24 hours at 1200° F. at a pressure of 15 p.s.i.g. The resulting aluminosilicate contained 0.2% by weight calcium and possessed excellent catalytic properties.

Example 67

A silicate solution was prepared by adding 2.28 lbs. of an aluminosilicate identified as Zeolite 13X which had been treated with rare earth chlorides and 6.25 lbs. of water. To this was added 13.9 lbs. of sodium silicate and 7.02 lbs. of water, with constant stirring. An acid solution was then prepared by mixing 28.55 lbs. of water, 2.12 lbs. of $Al_2(SO_4)_3 \cdot 18H_2O$, and 0.97 lb. of 96.7 weight percent sulfuric acid. The silicate and the acid solution were mixed continuously through a nozzle adding 492 cc. per minute of the silicate solution at 67° F. to 390 cc. per minute of the acid solution at 42° F. to form a hydrosol having a pH of 8.5 which gelled to a firm hydrogel in 1.9 seconds at 63° F. The hydrogel was then formed into a bead in a conventional manner and was treated with 1% solution of ammonium chloride using 3 overnight and 9 two-hour contacts at room temperature. The aluminosilicate was washed with water until the effluent contained no chloride ions, dried for 20 hours at 275° F., calcined for 10 hours at 1000° F. and then treated for 30 hours at 1200° F. with steam at 15 p.s.i.g. The resulting catalyst had a sodium content of 0.05% by weight and a rare earth content of 7.16% by weight determined as rare earth oxides.

[2] 44.51 wt. percent $Al_2O_3$, 38.51 wt. percent $SiO_2$, 1.27 wt. percent $Fe_2O_3$, 1.47 wt. percent $TiO_2$, 0.08 wt. percent CaO, 0.12 wt. percent MgO, 0.08 wt. percent $NA_2O$.

The cracking properties of the resulting catalyst are shown in the following table when it was evaluated for cracking gas oil at 900° F.:

TABLE 47

Cracking data:
  Conversion, vol. percent _____ 62.2
  LHSV _____ 4
  10 R.V.P. gaso., vol. percent _____ 51.6
  Excess $C_4$'s, vol. percent _____ 12.1
  $C_5$+ gasoline, vol. percent _____ 49.2
  Total $C_4$'s, vol. percent _____ 14.5
  Dry gas, wt. percent _____ 6.9
  Coke, wt. percent _____ 3.2
  $H_2$, wt. percent _____ 0.03

Δ advantage:
  10 R.V.P., vol. percent _____ +5.6
  Excess $C_4$'s, vol. percent _____ −2.4
  $C_5$+ gasoline, vol. percent _____ +5.4
  Total $C_4$'s, vol. percent _____ −2.2
  Dry gas, wt. percent _____ −1.1
  Coke, wt. percent _____ −1.8

What is claimed is:

1. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing from 0.5 to 1.0 equivalents per gram atom of aluminum of ions of positive valence consisting of both hydrogen ions and cations of metals selected from Groups IB through VIII of the Periodic Table characterized by containing from 0.01 to 0.99 equivalent of hydrogen ion per gram atom of aluminum and from 0.99 to 0.01 equivalent per gram atom of aluminum, of cations of metals selected from Group IB through Group VIII of the Periodic Table.

2. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing from 0.8 to 1.0 equivalent per gram atom of aluminum of ions of positive valence consisting of both hydrogen ions and cations of metals selected from Groups IB through VIII of the Periodic Table characterized by containing from 0.01 to 0.99 equivalent of hydrogen ion per gram atom of aluminum and from 0.99 to 0.01 equivalent, per gram atom of aluminum, of cations of metals selected from Group IB through Group VIII of the Periodic Table.

3. In the catalytic cracking of hydrocarbon oil to produce hydrocarbons of lower boiling range, the improvement of contacting said oil under cracking conditions with discrete particles of a catalyst composition consisting of an inorganic oxide matrix with a crystalline aluminosilicate containing 1.0 equivalent per gram atom of aluminum of positive ions consisting of both hydrogen ions and cations of metals selected from Group IB through Group VIII of the Periodic Table characterized by containing from 0.01 to 0.99 equivalent of hydrogen ion per gram atom of aluminum and from 0.99 to 0.01 equivalent, per gram atom of aluminum, of cations of metals selected from Group IB through Group VIII of the Periodic Table.

4. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing from 0.5 to 1.0 equivalent of ions of positive valence per gram atom of aluminum consisting of both hydrogen ions and calcium ions characterized by containing from 0.01 to 0.99 equivalent of hydrogen ion per gram atom of aluminum and from 0.99 to 0.01 equivalent per gram atom of aluminum of calcium ions.

5. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing from 0.8 to 1.0 equivalent of ions of positive valence per gram atom of aluminum consisting of both hydrogen ions and calcium ions wherein the calcium ions comprise from 40 to 85% of the total equivalents of ions of positive valence.

6. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing from 0.5 to 1.0 equivalent of ions of positive valence per gram atom of aluminum consisting of both hydrogen ions and magnesium ions wherein the magnesium ions comprise from 40 to 85% of the total equivalents of ions of positive valence.

7. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing from 0.8 to 1.0 equivalent of ions of positive valence per gram atom of aluminum consisting of both hydrogen ions and magnesium ions wherein the magnesium ions comprise 40 to 85% of the total equivalents of ions of positive valence.

8. In the catalytic cracking of a hydrocarbon oil to produce hydrocarbons of lower boiling range, the improvement of contacting said oil under cracking conditions with discrete particles of a catalyst composition consisting of an inorganic oxide matrix with a crystalline aluminosilicate containing 1.0 equivalent per gram atom of aluminum of ions of positive valence consisting of both hydrogen ions and magnesium ions wherein the magnesium ions comprise 40 to 85% of the total equivalents of ions of positive valence.

9. The process of claim 2 wherein the aluminosilicate has an atomic ratio of silicon to aluminum greater than 1.6.

10. The process of claim 2 wherein the aluminosilicate has an atomic ratio of silicon to aluminum greater than 2.7.

11. The process of claim 5 wherein the aluminosilicate has an atomic ratio of silicon to aluminum greater than 1.6.

12. The process of claim 5 wherein the aluminosilicate has an atomic ratio of silicon to aluminum greater than 2.7.

13. The process of claim 7 wherein the aluminosilicate has an atomic ratio of silicon to aluminum greater than 1.6.

14. The process of claim 7 wherein the aluminosilicate has an atomic ratio of silicon to aluminum greater than 2.7.

15. A process for converting a hydrocarbon charge which comprises contacting the same under conversion conditions with a catalyst comprising a crystalline aluminosilicate containing from 0.5 to 1.0 equivalent per gram atom of aluminum of ions of positive valence consisting of both hydrogen ions and cations of metals selected from Group IB through Group VIII of the Periodic Table characterized by containing from 0.01 to 0.99 equivalent per gram atom of aluminum, of hydrogen ion, and from 0.99 to 0.01 equivalent, per gram atom of aluminum, of cations of metals selected from Group IB through Group VIII of the Periodic Table, which aluminosilicate is contained in and distributed throughout a matrix therefor.

16. The process of claim 2 wherein the metal cations are cations of trivalent metals.

17. The process of claim 2 wherein the metal cations are cations of divalent metals.

18. In the catalytic cracking of hydrocarbon oil to produce hydrocarbons of lower boiling range, the improvement of contacting said oil under cracking conditions with discrete particles of a catalyst composition consisting of an inorganic oxide matrix with a crystalline aluminosilicate having no more than 0.25 equivalent per gram atom of aluminum of alkali metal cations and containing from 0.8 to 1.0 equivalent per gram atom of aluminum of ions of positive valence consisting of both hydrogen ions and cations of metals selected from Group IB through Group VIII of the Periodic Table.

19. In a process for the cracking of a hydrocarbon charge with a solid porous catalyst wherein the products obtained comprise both economically valuable liquid hydrocarbons boiling in the motor fuel range and undesirable by-products of lesser economic significance, the improvement in selectively evidenced by the production of a substantially greater amount of said valuable liquid hydrocarbons together with concomitant reduction in the yield of undesired by-products from a given hydrocarbon charge, which comprises contacting said charge under cracking conditions with a catalyst composition comprising an inorganic oxide matrix having dispersed therein an aluminosilicate having an ordered crystalline structure and containing from 0.5 to 1.0 equivalent per gram atom of aluminum of ions of positive valence wherein the enhanced selectivity of said catalyst composition arises from the fact that the aluminosilicate has associated therewith both hydrogen ions and cations of metals selected from Group IB through Group VIII of the Periodic Table.

References Cited in the file of this patent

UNITED STATES PATENTS

| | | |
|---|---|---|
| 2,369,074 | Pitzer | Feb. 6, 1945 |
| 2,962,435 | Fleck et al. | Nov. 29, 1960 |
| 2,971,903 | Kimberlin et al. | Feb. 14, 1961 |
| 2,971,904 | Gladrow et al. | Feb. 14, 1961 |
| 3,033,778 | Frilette | May 8, 1962 |